(12) United States Patent
Anwar et al.

(10) Patent No.: US 10,536,068 B2
(45) Date of Patent: Jan. 14, 2020

(54) HYBRID FEEDFORWARD CONTROL ARCHITECTURE AND RELATED TECHNIQUES

(71) Applicant: The Regents of the University of Colorado, Denver, CO (US)

(72) Inventors: Usama Anwar, Boulder, CO (US); Khurram K. Afridi, Boulder, CO (US); Dragan Maksimovic, Boulder, CO (US)

(73) Assignee: The Regents of the University of Colorado, a body corporate, Denver, CO (US)

( * ) Notice: Subject to any disclaimer, the term of this patent is extended or adjusted under 35 U.S.C. 154(b) by 0 days.

(21) Appl. No.: 15/633,748

(22) Filed: Jun. 26, 2017

(65) Prior Publication Data
US 2017/0373585 A1    Dec. 28, 2017

Related U.S. Application Data

(60) Provisional application No. 62/354,796, filed on Jun. 26, 2016.

(51) Int. Cl.
*H02M 3/156* (2006.01)
*H02M 7/02* (2006.01)
(Continued)

(52) U.S. Cl.
CPC ............ *H02M 1/08* (2013.01); *H02M 1/4225* (2013.01); *H02M 3/1582* (2013.01);
(Continued)

(58) Field of Classification Search
CPC . H02M 2001/0012; H02M 2001/0016; H02M 2001/0022; H02M 2001/0025;
(Continued)

(56) References Cited

U.S. PATENT DOCUMENTS

| | | | | |
|---|---|---|---|---|
| 4,356,440 A | * | 10/1982 | Curtiss | H02J 3/1835 322/20 |
| 4,975,819 A | * | 12/1990 | Lannuzel | H02M 3/005 323/222 |

(Continued)

OTHER PUBLICATIONS

Ray et al, "Hybrid feedforward-feedback active noise reduction for hearing protection and communication", Oct. 2006, Journal of Acoustic Society of America, pp. 2026-2036.*

(Continued)

*Primary Examiner* — Gary L Laxton
(74) *Attorney, Agent, or Firm* — FisherBroyles, LLP; Thomas J. Osborne, Jr.

(57) ABSTRACT

A systematic procedure for the synthesis of hybrid feedforward control architectures for pulse-width modulated (PWM) switching converters is provided. In this hybrid feedforward control architecture selected converter variables are sensed and utilized in a particular way based on the converter open-loop characteristics to determine the duty-cycle needed to achieve a control objective. Compared to standard feedback control techniques, advantages can include simpler controller implementation, more convenient sensing, and improved static and dynamic regulation. An example systematic procedure for developing hybrid feedforward controllers is illustrated by first considering a previously known example of hybrid feedforward control: hybrid feedforward control of a boost power factor correction (PFC) rectifier operating in discontinuous conduction mode (DCM). The hybrid feedforward control synthesis principles are also used to realize new hybrid feedforward control architectures, such as a four switch buck boost converter.

23 Claims, 26 Drawing Sheets

(51) Int. Cl.
*H02M 7/42* (2006.01)
*H02M 1/08* (2006.01)
*H02M 1/42* (2007.01)
*H02M 1/00* (2006.01)
*H02M 3/158* (2006.01)

(52) U.S. Cl.
CPC ............... *H02M 2001/007* (2013.01); *H02M 2001/0016* (2013.01); *Y02B 70/126* (2013.01)

(58) Field of Classification Search
CPC ... H02M 2001/0067; H02M 2001/007; H02M 7/06; H02M 7/02; H02M 7/155; H02M 7/21; H02M 7/217; H02M 7/42; H02M 7/53; H02M 7/537; H02M 3/158
USPC .............. 323/222, 266, 271, 282, 283, 285; 363/89
See application file for complete search history.

(56) References Cited

U.S. PATENT DOCUMENTS

| | | | | |
|---|---|---|---|---|
| 5,570,276 | A * | 10/1996 | Cuk | H02M 3/005 323/266 |
| 6,138,042 | A * | 10/2000 | Midya | H03F 1/0227 323/222 |
| 8,736,246 | B2 * | 5/2014 | Yeh | H02M 1/4225 323/207 |
| 9,755,532 | B2 * | 9/2017 | Karlsson | H02M 3/33569 |
| 9,819,277 | B2 * | 11/2017 | Karlsson | H02M 3/33507 |
| 2012/0314467 | A1 * | 12/2012 | O'Brien | H02J 3/383 363/131 |
| 2013/0077362 | A1 * | 3/2013 | Kumar | H02M 1/4225 363/49 |

OTHER PUBLICATIONS

Huang et al, "Hybrid buck-boost feedforward and reduced average inductor current techniques in fast line transient and high-efficiency buck-boost converter", Mar. 2010, vol. 25, No. 3, pp. 719-730.*
Wu et al, "Decoupling feedforward and feedback structures in hybrid active noise control systems for uncorrelated narrowband disturbances", May 2015, Journal of Sound and Vibration, pp. 1-10.*

* cited by examiner

HYBRID FEEDFORWARD CONTROL ARCHITECTURE AND RELATED TECHNIQUES

CROSS-REFERENCE TO RELATED APPLICATIONS

This application claims the benefit of U.S. provisional application No. 62/354,796, filed Jun. 26, 2016 entitled "Hybrid Feedforward Control, Efficient Matching Networks and Combinations Thereof," which is hereby incorporated by reference as though fully set forth herein.

BACKGROUND a. Field

The present disclosure relates to hybrid feedforward control of power converters.

b. Background

A block diagram of a conventional pulse-width modulated (PWM) switching power converter is shown in FIG. 1. In this example, the converter has an input $u_{in}$, an output $u_{out}$, and is controlled by a duty-cycle command d. Conventionally, a feedback controller is designed around the power converter to regulate the output and achieve a control objective $u_{out} = u_{ref}$, where the reference command $u_{ref}$ can be an independent signal or can depend upon converter averaged voltage(s), current(s) or power. In the conventional feedback controller, output $u_{out}$ is sensed and compared with the reference $u_{ref}$. The error between the two is passed to a compensator $G_c(s)$. This compensator generates the duty cycle command d for a pulse-width modulator, which produces converter switch control signals. While the compensator parameters are typically determined based on a converter averaged small-signal model and standard frequency-domain control-loop design techniques, the conventional controller architecture does not make use of the converter intrinsic characteristics or topological relationships. In some cases, the number of sensors required to sense the converter states can thus be more than the minimum number of sensors required to control the converter. This increases layout complexities, and hardware and engineering costs associated with the power converter. Thus, there is a need for control architectures with a reduced sensing requirement that could potentially also have improved static and dynamic performance.

In addition to sensing inconvenience, there are many applications where the choice of the power converter is constrained by the controller complexity associated with some topologies. This eliminates certain otherwise desirable power converter topologies from being considered for particular applications. An example of this can be seen in the traditional architecture for ac-dc conversion shown in FIG. 2. This converter architecture comprises an ac-dc conversion stage followed by an output voltage regulation stage. The ac-dc conversion stage draws active power from the grid by drawing input current in-phase with the input voltage of the converter. The twice-line-frequency ripple in the output power of the ac-dc conversion stage is buffered by an energy buffering capacitor, C. The traditional converter employed for power factor correction (PFC) is a boost converter due to the ease of synthesizing a single controller able to operate over a large range of input voltage. Since the output voltage of the boost converter has to be greater than the peak input voltage (374 V for universal input ac-dc converters), the bus voltage is nominally chosen to be around 400 V. In applications requiring the load voltage to be much lower than the peak input ac voltage, this poses significant voltage stresses on the second stage of the converter. The large conversion ratio required from the second stage results in this stage needing to process large fraction of indirect power, decreasing the efficiency of the stage and the overall converter. Thus, even though utilization of the boost converter in the ac-dc stage offers advantages in terms of the synthesis of the controller utilizing the standard feedback control approach, the efficiency of the overall converter suffers due to the boosting nature of its first stage. Hence, having a control architecture that would enable a power converter topology which can achieve a bus voltage lower than the peak input ac voltage, while having a simple control implementation for ac-dc conversion may be desirable.

BRIEF SUMMARY

A systematic procedure for the synthesis of hybrid feedforward control architectures for pulse-width modulated (PWM) switching converters is provided. In this hybrid feedforward control architecture selected converter variables are sensed and utilized in a particular way based on the converter open-loop characteristics to determine the duty-cycle needed to achieve a control objective. Compared to standard feedback control techniques, advantages can include simpler controller implementation, more convenient sensing, and improved static and dynamic regulation. An example systematic procedure for developing hybrid feedforward controllers is illustrated by first considering a previously known example of hybrid feedforward control: hybrid feedforward control of a boost power factor correction (PFC) rectifier operating in discontinuous conduction mode (DCM).

The hybrid feedforward control synthesis principles are also used to realize new hybrid feedforward control architectures. In one example, a PFC rectifier based on a four-switch (non-inverting) buck-boost converter utilizing hybrid feedforward control is provided. This simple control architecture allows the converter to operate in continuous conduction mode, with smooth transitions between the buck and the boost operations across a line-cycle. To implement the PFC functionality, the controller computes the buck and the boost duty cycles based only on the sensed inductor current and output voltage. The hybrid feedforward controller operation and converter design are verified by experiments on a universal-input, 110-V output, 1-kW four-switch buck-boost PFC rectifier prototype.

In another example, a hybrid feedforward controller for a buck converter based battery charger that regulates the charging power is also provided. Taken together, the four-switch buck-boost PFC converter and the buck regulator (both utilizing hybrid feedforward control) can be utilized as offline battery chargers, as well as power supplies for various loads. In other examples, hybrid feedforward controllers for additional PWM converters are also provided. Special cases for ac-dc conversion achieved using boost, Cuk, SEPIC, buck-boost and flyback converter controlled using hybrid feedforward controllers are also provided.

The foregoing and other aspects, features, details, utilities, and advantages of the present invention will be apparent from reading the following description and claims, and from reviewing the accompanying drawings.

BRIEF DESCRIPTION OF THE DRAWINGS

FIG. 5(a) PFC functionality implemented using conventional average current mode feedback control and FIG. 5(b) shows a combined hybrid feedforward-feedback control, according to one or more embodiments described and shown herein. In these implementations, the feedback control architecture is not affected by the converter topology, as the converter topology and its circuit element values are only used to determine the compensator parameters. In contrast, hybrid feedforward control utilizes the converter topology and characteristics in the control architecture. In these examples, the converter independent variables, input voltage $v_{in}$, and output voltage $v_{out}$, are utilized to synthesize the hybrid feedforward controller.

FIG. 7(a) shows the converter architecture, and FIG. 7(b) shows a large signal model of the converter.

FIG. 10(a) shows a synchronous converter and FIG. 10(b) shows an asynchronous converter.

DETAILED DESCRIPTION

Figure 1:
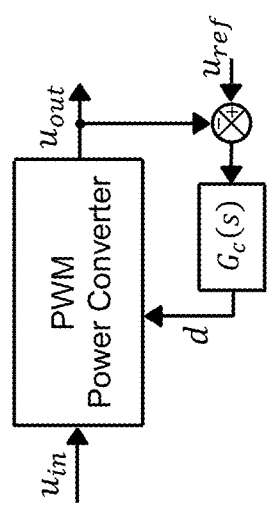
FIG. 1 shows a schematic diagram of a feedback controller architecture for a pulse-width modulated (PWM) switching converter.
Figure 2:
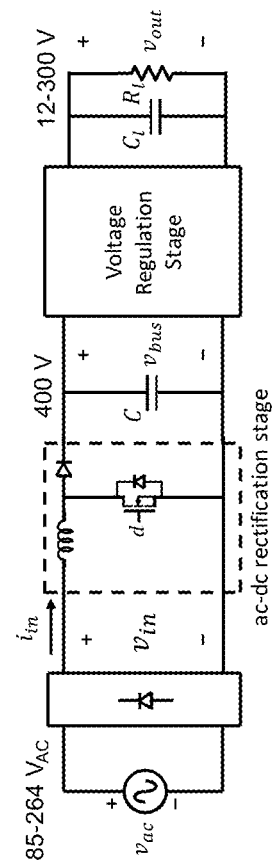
FIG. 2 shows a schematic diagram of an example ac-dc converter architecture including an ac-dc rectification boost stage and a voltage regulation stage. Presence of a boost converter forces the ac-dc rectification stage to have output voltage greater than peak input voltage, which stresses the second stage of the converter and degrades converter efficiency.
Figure 3:
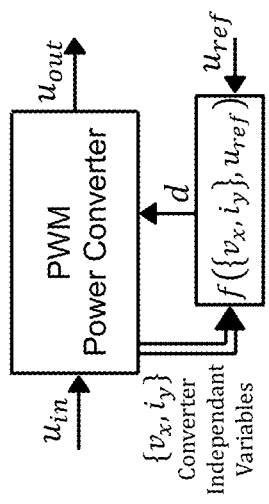
FIG. 3 shows a schematic diagram showing control of pulse width modulated (PWM) switching converters: (a) Conventional feedback controller architecture and (b) Hybrid feedforward controller architecture. Instead of sensing the output and comparing it with a reference command, the hybrid feedforward controller senses converter independent variables $\{v_x, i_y\}$ and processes them directly using the converter open loop characterisitcs to determine the switch duty cycle d so as to achieve a control objective $u_{out}=u_{ref}$, according to one or more embodiments described and shown herein.

Control architectures can be synthesized on PWM switching converters which differ from feedback control architectures shown in FIG. 1. In contrast, converter intrinsic relationships can be utilized to synthesize controllers. Consider well-known feedforward control of buck converters, in which the duty cycle is determined, at least in part, based on the converter topology and conversion characteristics. This concept can be generalized as shown in FIG. 3. In contrast to the conventional feedback control architecture shown in FIG. 1, in FIG. 3 the converter independent variables $\{v_x, i_y\}$ are sensed and processed directly to generate the duty cycle command $d=f(\{v_x, i_y\}, u_{ref})$ so as to achieve the desired control objective $u_{out}=u_{ref}$. The relationship $d=f(\{v_x, i_y\}, u_{ref})$ is derived based on the converter open loop steady-state characteristics. The control strategy involves sensing the converter independent variables, which may involve duty-cycle dependent as well as duty-cycle independent variable(s). As a result, the control architecture shown in FIG. 3 may include feedforward and feedback loops, and is therefore referred to as hybrid feedforward control architecture. The control architecture is differentiated from pure feedforward control architecture, in which the duty cycle command is determined solely based on input(s) (duty cycle independent converter variable(s)). Pure feedforward control is considered different from hybrid feedforward control and is not discussed here.

Several previously reported control approaches can be identified as examples of the hybrid feedforward control architecture for PWM converters. Examples include non-linear carrier control for power factor correction (PFC) converters operating in continuous conduction mode (CCM) and open loop control of boost PFC converters operating in discontinuous conduction mode (DCM). All of these control strategies can be considered particular implementations of the architecture shown in FIG. 3. The hybrid feedforward control architectures can achieve certain advantages over the conventional feedback architecture. Since there is a degree of freedom in choosing converter independent variables, reduced or more convenient sensing can be employed. Furthermore, hybrid feedforward approaches can lead to simpler controller implementations, and improved static and dynamic regulation. Additionally, it is also possible to embed hybrid feedforward control loops inside feedback loops, which can achieve benefits of both.

Hybrid feedforward control approach offers an alternate approach to synthesize controllers on power converters. In applications where synthesizing feedback control architecture can be very challenging, hybrid feedforward controllers can offer much simpler solution. In this context consider the ac-dc conversion example discussed earlier.

As discussed earlier, from the system level perspective, it can be important to achieve high end-to-end converter efficiency. One possible way to achieve this is to allow bus voltage to be lower than peak input voltage. This can reduce the voltage stress on the second stage, increasing the converter efficiency. One approach that has good merits is four-switch buck-boost converter shown in FIG. 4. The converter comprises a buck and boost stage. It operates as a buck converter when line voltage is greater than bus voltage and as a boost converter when line voltage goes lower than bus voltage. As can be observed in FIG. 4, the converter allows bus voltage to be lower than peak input voltage, reducing voltage stress on the second stage.

Hybrid feedforward control architecture can be generalized and synthesized systematically for PWM converters. Furthermore, in one example, a simple hybrid feedforward control architecture for allowing the four-switch buck-boost converter to achieve PFC functionality is provided. In this example, the converter is operated in continuous conduction mode (CCM) over the line cycle and controlled using a hybrid feedforward controller. It can be shown that to implement PFC operation, only two sensors (inductor current sensor and output voltage sensor) are required, as opposed to requirement of three sensors in conventional boost ac-dc converter, easing the hardware implementation. Additionally, the control architecture is relatively simple to implement, achieves automatic mode transition between buck and boost modes and can achieve good performance.

I. Example of Hybrid Feedforward Control Architecture

Figure 5A:
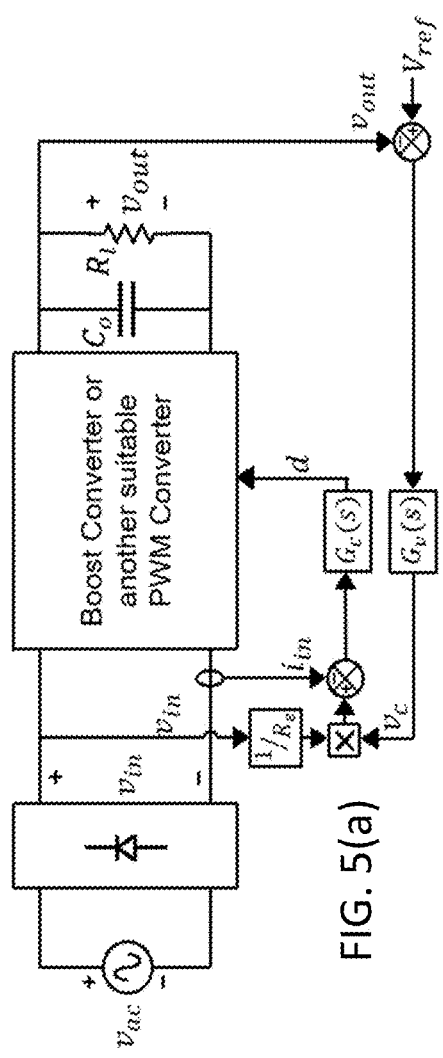
FIGS. 5(a) and 5(b) show a schematic diagram of an example implementation of a power factor correction functionality (PFC) implemented using two different control approaches.

Hybrid feedforward control of boost power factor correction (PFC) rectifiers can operate in discontinuous conduction mode. Conventional feedback control architecture is shown in FIG. 5(a). The control objective is to shape average input current to follow the input voltage. Hence, traditional average current mode control is realized by sensing the input voltage and using it to generate a reference for the sensed average input current. The error between the two signals is processed by a current-loop compensator, which generates a duty cycle command for the power converter. Output dc voltage regulation is realized by sensing the output voltage, comparing it with a reference, and passing the error through a voltage-loop compensator. The output of the voltage-loop compensator slowly modulates the amplitude of the input current. As illustrated in FIG. 5(a), this feedback control architecture remains unchanged, regardless of the converter topology employed. The converter topology and its circuit elements are only used to determine the compensator parameters. Furthermore, one can observe that although input voltage, input current and output voltage of the converter are related to each other by converter intrinsic relationships, these relationships are not utilized within the control architecture. This results in greater than minimum number of sensors required to implement the control functionality.

Figure 5B:
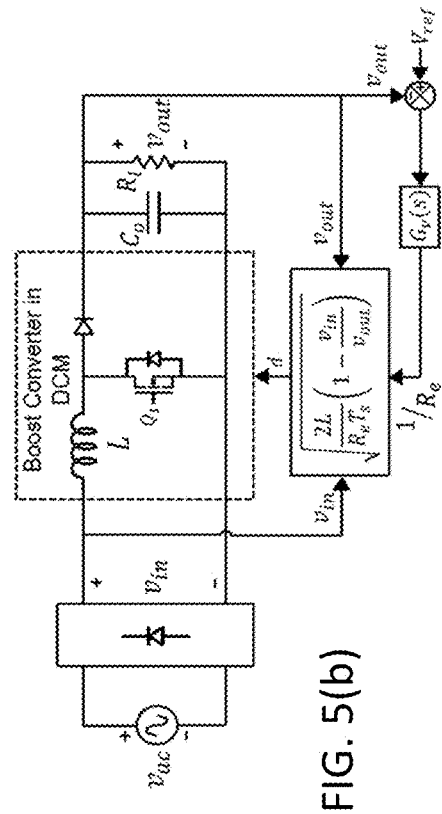
Figure 6:
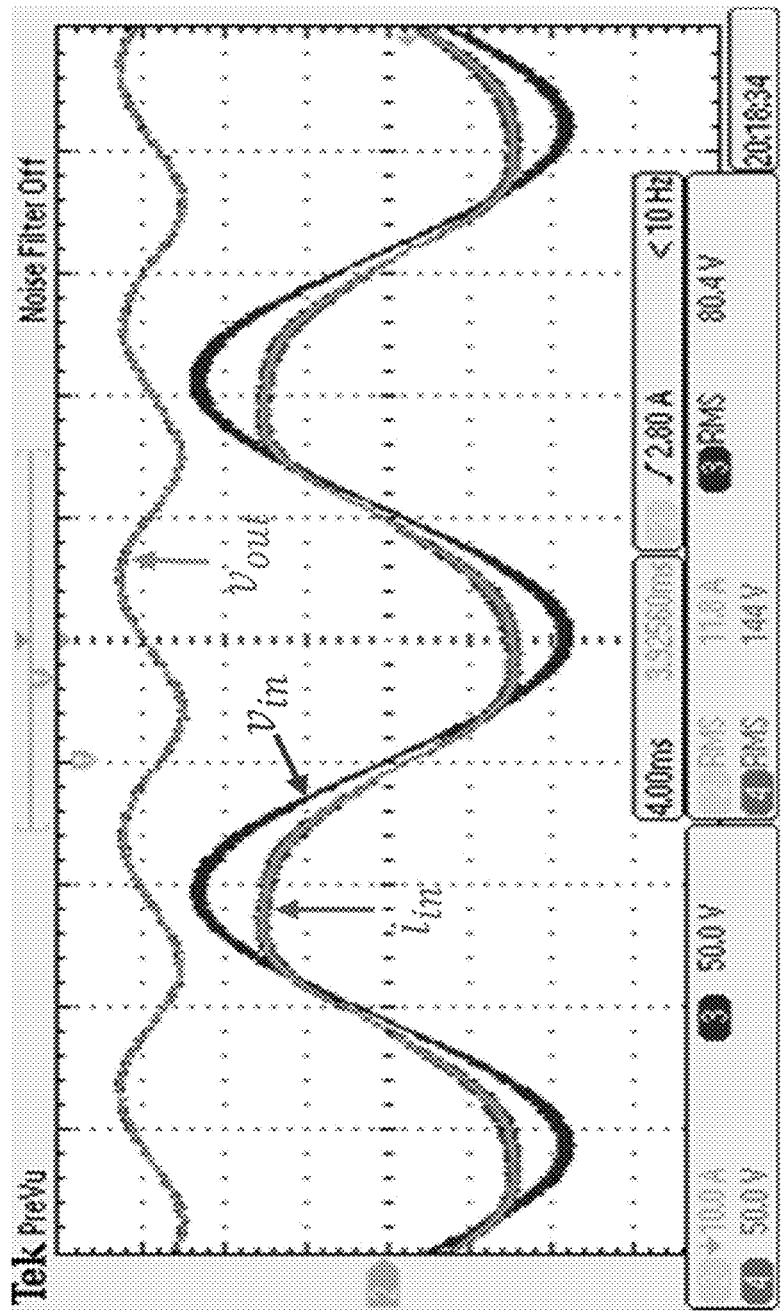
FIG. 6 depicts a graph showing input voltage ($v_{in}$), input current ($i_{in}$) and output voltage ($v_{out}$) waveforms of an example implementation of a boost converter operating in DCM and acting as a PFC stage with input voltage of 80 $V_{rms}$, input current of 11.8 $A_{rms}$ and output voltage of 144 V.

FIG. 5(b) shows an implementation of a hybrid feedforward control architecture for a DCM boost converter, where the converter intrinsic relationships can be used to achieve the control objectives while eliminating the need to sense the input current. In discontinuous conduction mode, average input (inductor) current can be expressed as [1]:

$$\langle i_{in} \rangle_{T_s} = \left( \frac{T_s}{2L} \cdot \frac{d^2}{1 - \frac{v_{in}}{v_{out}}} \right) v_{in}, \tag{4}$$

where $\langle i_{in} \rangle_{T_s}$ is the average input current, $v_{in}$ is the full-wave rectified input line voltage, $v_{out}$ is the output voltage, $T_s$ is the switching period, d is the duty cycle, and L is the boost inductance. From (4), one can observe that average input current can be predicted by sensing input voltage and output voltage of the converter, which removes the necessity to sense the input current. To implement this control functionality, one can modulate the duty cycle such that the first term (in the parenthesis) of (4) becomes constant, making input current proportional to input voltage $\langle i_{in} \rangle_{T_s} = v_{in}/R_e$. Hence, the required duty cycle command can be determined from (4) and expressed as:

$$d = \sqrt{\frac{2L}{R_e T_s} \left(1 - \frac{v_{in}}{v_{out}}\right)}, \tag{5}$$

where $R_e$ is the emulated input resistance of the converter. From (5), one can observe that sensing only input voltage and output voltage of the converter are required to achieve desired modulation of duty cycle. To regulate the output voltage, one can utilize the sensed output voltage to implement conventional outer voltage control loop, which modulates amplitude of the input current. The resulting control architecture is shown in FIG. 5 (b), highlighting the idea that known converter topology and converter characteristics can be used in synthesizing a controller. FIG. 6 shows experimental results for this control approach demonstrating good control performance.

Some benefits of combining hybrid feedforward and conventional feedback architectures are also illustrated by this example. For example, hybrid feedforward control can result in reducing the number of sensors and simplifying the hardware implementation of the control circuit, while the outer conventional feedback architecture results in tight output voltage regulation, correcting for any inaccuracies in extracting converter parameters (L, $T_s$).

II. General Considerations for Synthesis of Hybrid Feedforward Control

The DCM boost PFC example shown in FIG. 5(b) of Section I can be used as an illustrative example. In this example, a general block diagram for a hybrid feedforward controller around a switching power converter is shown in FIG. 3. The control objective is $u_{out} = u_{ref}$ where the converter output $u_{out}$ is the converter variable and is typically an average voltage or current of the PWM converter, and the reference command $u_{ref}$ can be either be an independent signal or can depend upon converter averaged voltage(s) or current(s). As an example, in the boost PFC converter shown in FIG. 5(b), output $u_{out}$ corresponds to average input current $\langle i_{in} \rangle_{T_s}$ and the control objective is:

$$u_{out} = \langle i_{in} \rangle_{T_s} = u_{ref} = v_{in}/R_e. \tag{6}$$

The hybrid feedforward control synthesis can be used to find a suitable functional relationship $d = f(\{v_x, i_y\}, u_{ref})$, i.e., a way to determine the duty cycle command that achieves the control objective. Depending on the nature of the control objective, and the converter topology and its conversion characteristics, the solution may not be unique. In general, it is desirable, although not necessary, to achieve additional objectives such as minimization of sensing requirements or simplicity of analog or digital controller implementation.

In one example, a set of converter independent variables (voltage(s) and/or current(s)) $u^* = \{v_x^*, i_y^*\}$ averaged over a switching interval is identified first. A variable is considered independent if it cannot be determined from converter open-loop characteristics based on the knowledge of other independent variables and duty cycle d. Thus, in steady state any other converter variable can be expressed in terms of this necessary and sufficient set of converter independent variables $u^*$, along with the converter duty cycle d. As an example, in an ideal converter operating in CCM, converter voltages and currents are independent from each other, as the converter conversion ratio is independent of load current. Thus at least one converter voltage and one converter current should be identified as independent. While, in an ideal converter operating in DCM, converter voltages and currents are not independent from each other as the converter conversion ratio depends upon the load current. Thus, it is possible to identify a set of independent variables including only voltage(s) or only current(s), or a mix of voltages and currents. In the example of Section I, input voltage $v_{in}$ and output voltage $v_{out}$ of the converter are identified as independent variables $u^* = \{v_{in}, v_{out}\}$. It should be further noted that the independent variables need not necessarily be converter state variables. For example, average switch current can also be identified as an independent variable, as is usually done in non-linear carrier control. This provides more freedom in making a choice of the independent variables, as sensing some of these is necessary to implement a hybrid feedforward controller, allowing designers to employ more convenient sensing.

Once a suitable set of independent variables $u^* = \{v_x^*, i_y^*\}$ is identified, any other converter variable can be expressed based on the converter steady-state characteristics in terms of the variables in $u^*$ and the duty cycle d. The next step is to represent the converter output $u_{out}$ as a function of a subset of independent variables, $\{v_x, i_y\} \subseteq \{v_x^*, i_y^*\}$ and duty cycle d using the converter intrinsic conversion characteristics:

$$u_{out} = g(\{v_x, i_y\}, d), \tag{7}$$

and combine this with the control objective:

$$u_{out} = u_{ref}, \tag{8}$$

to arrive at the relationship:

$$g(\{v_x, i_y\}, d) = u_{ref} \quad (9)$$

which determines how duty cycle d should be modulated in order to achieve the desired control objective (8). Solving (9) for d yields the duty cycle command:

$$d = f(\{v_x, i_y\}, u_{ref}) \quad (10)$$

which is shown in the hybrid feedforward controller block diagram in FIG. 1(b).

As already mentioned, the reference command $u_{ref}$ can either be an independent signal or dependent upon converter variables. If $u_{ref}$ is an independent signal, then $u_{out}$ in (7) involves dependence on duty cycle d. In the case $u_{ref}$ is dependent upon converter variables, possibly including d, this dependence should be included in (9) and (10). In all cases, the final expressions (9) and (10) should involve a subset of converter independent variables, and duty cycle d. In general, the independent variables that appear in the duty cycle modulation expressions (9) and (10) are the variables that need to be sensed.

To illustrate the hybrid feedforward synthesis method represented by (7)-(10), consider again the DCM boost example of Section I.B. In this case, $u^* = u = \{v_{in}, v_{out}\}$, $u_{out} = \langle i_{in} \rangle_{T_s} = u_{ref} = V_{in}/R_e$, and (9) becomes $$\langle i_{in} \rangle T_s = g(v_{in}, v_{out}, d) = \left( \frac{T_s}{2L} \cdot \frac{d^2}{1 - \frac{v_{in}}{v_{out}}} \right) v_{in} = \frac{v_{in}}{R_e}, \quad (11)$$

which yields the following duty cycle modulation equation.

$$d = f\left(v_{in}, v_{out}, \frac{v_{in}}{R_e}\right) = \sqrt{\frac{v_{in}}{R_e} \cdot \frac{2L}{T_s v_{in}} \left(1 - \frac{v_{in}}{v_{out}}\right)}. \quad (12)$$

It can be observed that the duty cycle expression (12) depends upon converter input voltage, output voltage and the reference command. The dependence of duty cycle command on the reference command can be further simplified here, as the reference command depends upon one of the converter variables (input voltage), $$d = f\left(v_{in}, v_{out}, \frac{1}{R_e}\right) = \sqrt{\frac{2L}{R_e T_s} \left(1 - \frac{v_{in}}{v_{out}}\right)}. \quad (13)$$

It should be noted here that the duty cycle modulation equation (9) or (10) can be implemented in multiple ways, which may involve analog or digital implementations. Direct duty cycle modulation is possible by programming the duty cycle modulation equation (10) into a microcontroller. Also relatively simple analog circuits can be designed to solve (9), such as demonstrated in D. Maksimović, Y. Jang, and R. W. Erickson, "Nonlinear-carrier control for high-power-factor boost rectifiers," *IEEE Trans. Power Electron.*, vol. 11, no. 4, pp. 578-584, 1996 (Maksimovic et al.), Z. Lai, K. M. Smedley, and Y. Ma, "Time quantity one-cycle control for power-factor correctors," *IEEE Trans. Power Electron.*, vol. 12, no. 2, pp. 369-375, 1997 (Lai et al.), and R. Erickson, M. Madigan, and S. Singer, "Design of a simple high-power-factor rectifier based on the flyback converter," *Applied Power Electronics Conference and Exposition*, 1990. APEC '90, Conference Proceedings 1990, *Fifth Annual*. pp. 792-801, 1990 (Erickson et al.), each of which is incorporated herein by reference in its entirety.

III. Example Hybrid Feedforward Control Architecture

Figure 7A:
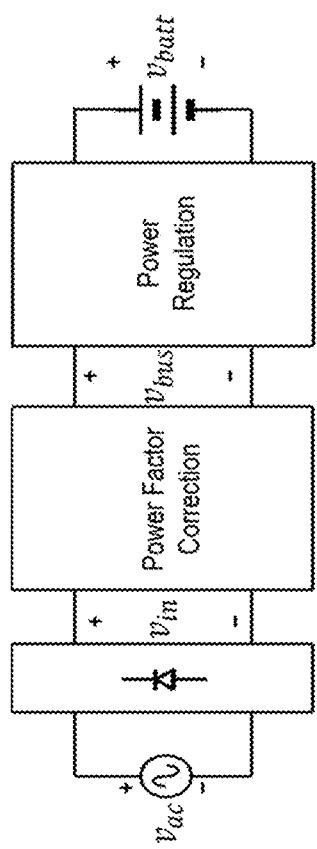
FIGS. 7(a) and 7(b) show schematic diagrams of a converter for battery charging considered as an example to illustrate the development of hybrid feedforward control architecture.
Figure 7B:
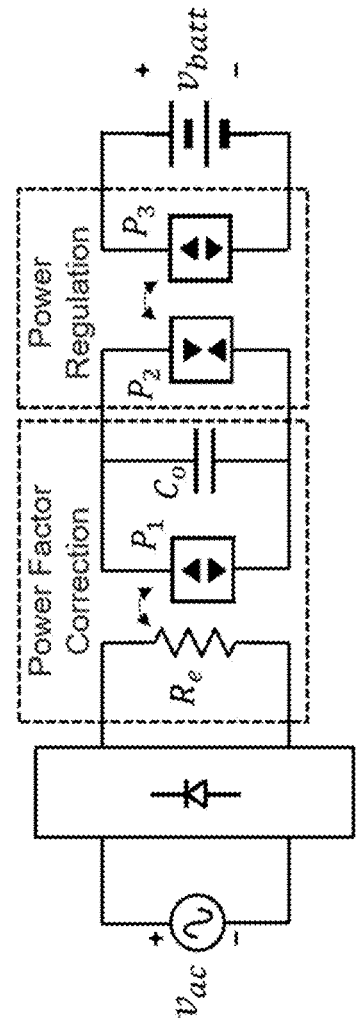

The general considerations discussed in Section II can be used to synthesize new hybrid feedforward control architectures. Consider an example of an offline battery charger application shown in a block diagram form in FIG. 7(a). The first stage is an ac-dc PFC rectifier, followed by a second stage that regulates the battery charging power. FIG. 7(b) shows a large signal averaged model of this architecture, where the ac-dc conversion stage is modelled by a loss-free resistor, followed by the power regulation stage which behaves as a power sink at its input port and a power source at its output port.

Figure 4:
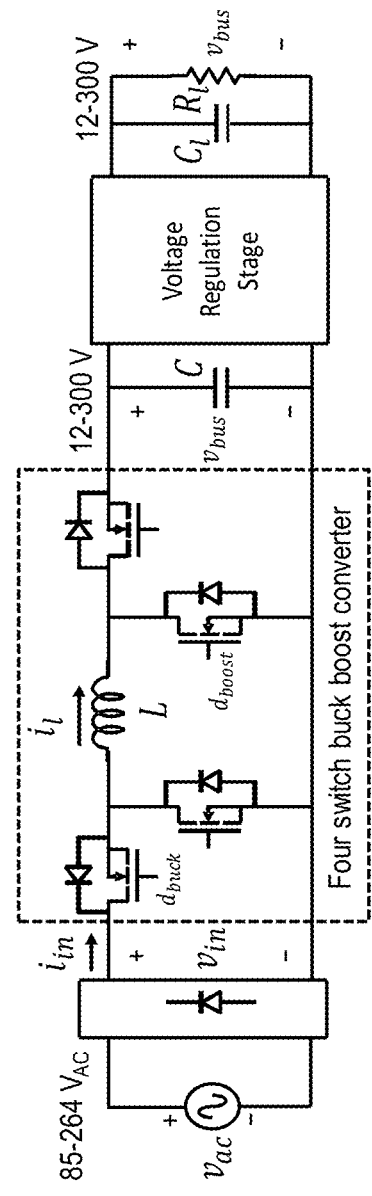
FIG. 4 shows a schematic diagram of an example ac-dc converter architecture including a four-switch buck-boost based ac-dc rectification stage followed by a voltage regulation stage, according to one or more embodiments described and shown herein. In this example, the presence of the four-switch buck-boost converter allows the ac-dc rectification stage to have output voltage lower than the peak input ac voltage, reducing the stress on second stage of the converter.
Figure 8:
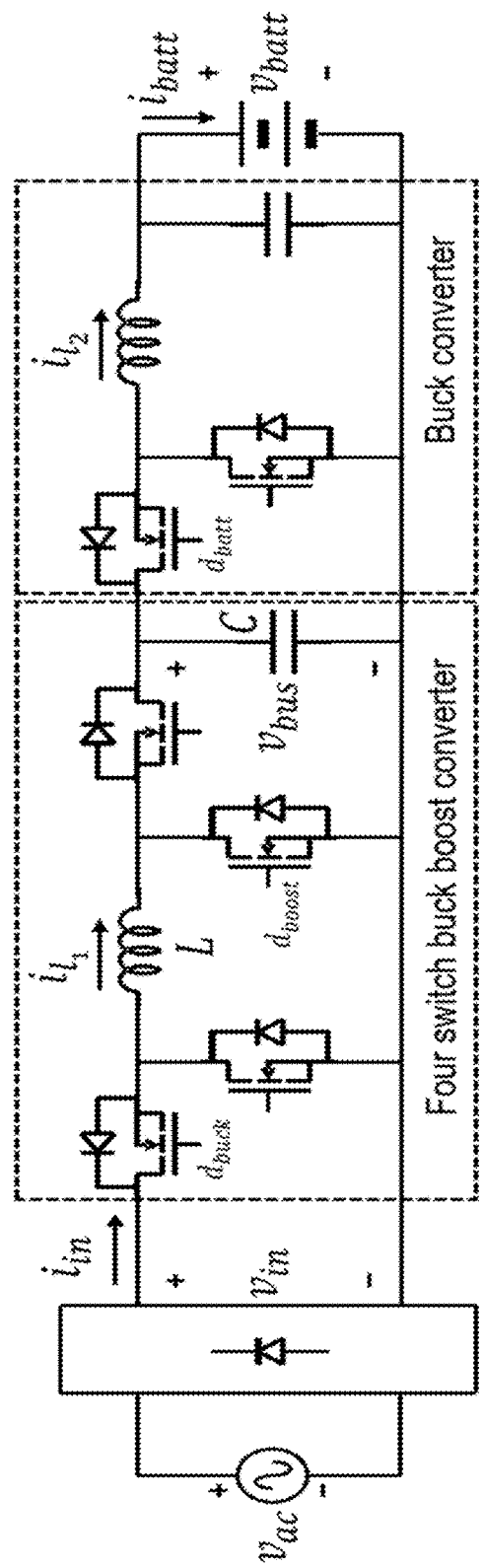
FIG. 8 shows a schematic diagram of an example implementation of a battery charger circuit including a first stage four-switch buck-boost converter, functioning as a PFC stage. Two independent duty cycle commands are marked as $d_{buck}$ and $d_{boost}$. In this implementation, a second stage is a buck converter functioning as power regulation stage.

To realize the PFC ac-dc conversion stage, a four-switch buck-boost converter is selected as shown in FIG. 4 and FIG. 8. This particular converter topology enables the output voltage of the PFC stage to be lower than the peak input voltage, as the converter operation can switch between buck or boost modes during different periods of the line cycle. Hence, the step-down conversion ratio required from the second stage can be reduced. This can be advantageous if the battery voltage is much lower than the peak input voltage.

Figure 9:
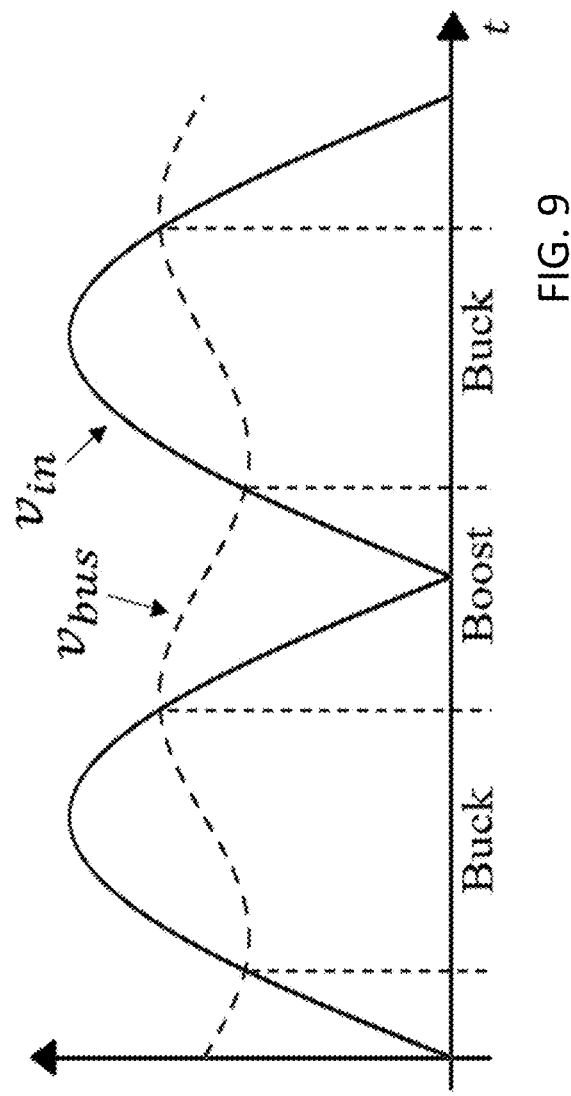
FIG. 9 shows a graph showing example operational modes of an example four-switch buck-boost converter over a line cycle. In this implementation, the converter transitions between buck and boost modes when input voltage in greater than and less than output voltage of the converter respectively.

A. Four-Switch Buck-Boost Converter Based PFC Rectifier:

Topology of four-switch buck-boost converter is shown in FIG. 8. The converter in this example comprises a buck stage and a boost stage that share the same inductance. When the converter is used for PFC operation, output voltage of the converter can be smaller than peak input voltage, but greater than zero. Thus, the converter operates in buck and boost modes of operation when the input voltage is greater than and smaller than output voltage of the converter, respectively, as shown in FIG. 9. For an ideal operation of the converter, the mode transition happens when input line voltage is equal to output voltage of the converter.

Two considerations: topology selection and energy buffering capacitor selection are discussed below:

1. Topology Considerations

Figure 10A:
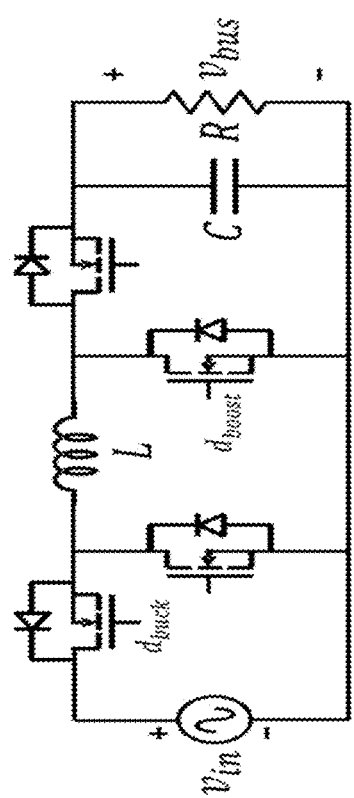
FIGS. 10(a) and 10(b) shows schematic diagrams of example implementations of a four-switch buck-boost converter topologies.
Figure 10B:
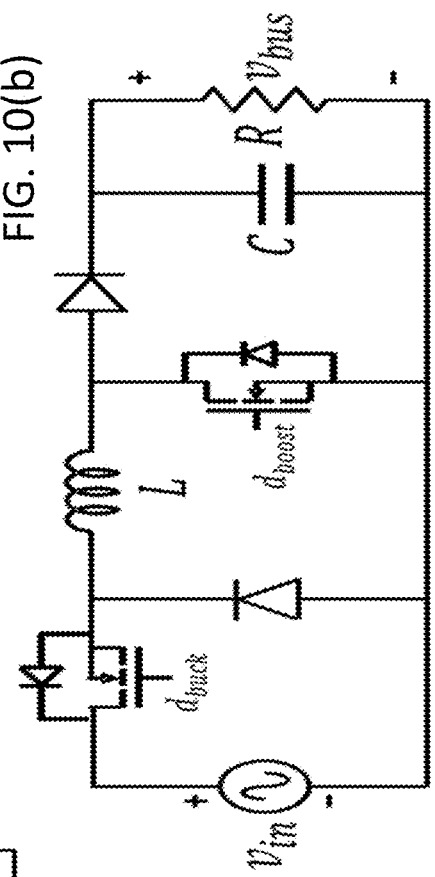

Four-switch buck-boost converter can be realized as either synchronous or asynchronous converter. Synchronous and asynchronous topologies of the converter are shown in FIG. 10. If the converter is operated as synchronous converter, the converter remains in CCM over the complete line cycle. On the other hand, asynchronous operation of the converter can possibly lead to CCM and DCM mode of operation of the converter. The control architecture considered in Section (3) only works for CCM mode of operation of the converter. Thus, it becomes important to design the asynchronous converter to remain in CCM over the line cycle.

2. Energy Buffering Capacitor Selection

An output capacitor of the four-switch buck-boost converter acts as an energy buffering capacitor and buffers the difference of input ac power and output dc power. Due to energy buffering, twice line frequency ripple appears in the capacitor voltage. Ripple in capacitor voltage can be expressed as:

$$\Delta V_{bus} = \frac{P_{dc}}{2CV_{nom, bus} \omega_l}. \quad (14)$$

Here $\Delta V_{bus}$ is bus voltage ripple, $P_{dc}$ is load power, $V_{nom,bus}$ is nominal bus voltage and $\omega_l$ is line frequency. From (14), one can note that lowering the nominal bus node voltage leads to larger ripple across the capacitor. This can be compensated by increasing the size of capacitor proportionally. Therefore, a tradeoff between larger capacitor size and smaller bus node voltage appears due to ac energy buffering in the capacitor.

Reducing the bus voltage, as possible with the proposed converter, will increase size of the capacitor proportionally. But it can be noted that the bus voltage is an intermediate system voltage which is regulated by voltage regulation stage as shown in FIG. 8. Thus, large bus voltage ripple can be afforded at the expense of power regulation stage regulating power in the load. Furthermore, it can be noted that since bus node voltage appears at twice line frequency, a relatively low frequency as compared to voltage regulation stage bandwidth, rejection of the ripple can be easily done by designing controller of voltage regulation stage properly.

Lastly, it is noted that it is possible for instantaneous bus voltage to become zero during operation of the converter, since minimum bus voltage ($V_{nom,bus} - \Delta V_{bus}$) can be much lower than nominal bus voltage $V_{nom,bus}$. This results in converter failing to operate. The situation can be avoided by choosing large enough capacitor and nominal bus voltage.

3. Synthesis of Converter Control Architecture

Figure 11:
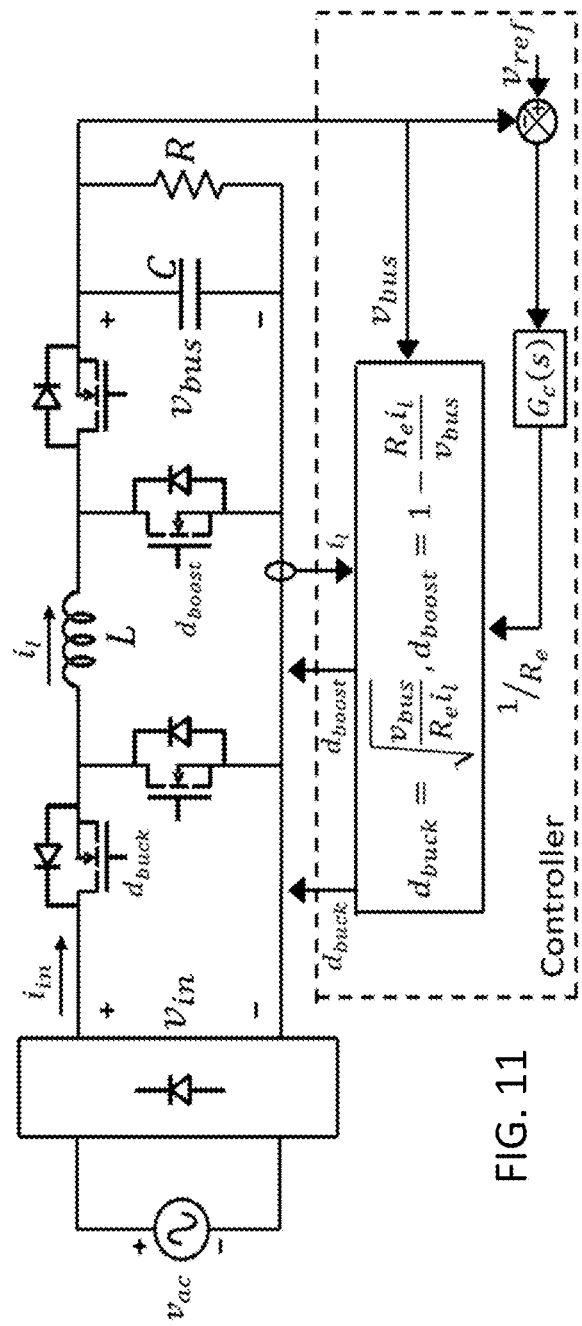
FIG. 11 shows a schematic diagram of an example four-switch buck-boost converter control architecture for PFC operation. In this implementation, inductor current and bus voltage are sensed and processed to generate two duty cycle commands $d_{buck}$ and $d_{boost}$. The architecture comprises of an inner hybrid feedforward current control loop and an outer voltage regulation loop.

The control architecture for making the converter act as PFC converter is shown in FIG. 11. The control architecture comprises an inner current control loop implemented through hybrid feedforward control architecture and an outer voltage loop implemented in standard feedback manner. The inner hybrid feedforward control loop achieves the objective of power factor correction expressed as $i_{in} = v_{in}/R_e$ and the outer voltage loop controls input power flow into the converter. As discussed in section II, a choice of converter independent variables can be made to achieve the desired control objective. In this example, inductor current $i_l$ and output voltage $v_{bus}$ are selected as converter independent variables. The choice of converter independent variables is well suited for sensing purposes, since output voltage $v_{bus}$ needs to be sensed to implement outer voltage loop and its sensing is independent of inner hybrid feedforward control loop. Thus, sensing of output voltage is utilized twice, in inner current control loop and outer voltage loop. Furthermore, sensing of inductor current is feasible since the current is continuous in nature and is not polluted with converter switching frequency signal. The sensed signals are sampled at the converter switching frequency and processed by microcontroller to compute two duty cycle commands $d_{buck}$ and $d_{boost}$. The two duty cycle commands can be expressed in terms of chosen independent variables as:

$$d_{boost}(\langle i_l \rangle_{T_s}, v_{bus}) = 1 - \frac{R_e \langle i_l \rangle_{T_s}}{v_{bus}}, \quad (15)$$

$$d_{buck}(\langle i_l \rangle_{T_s}, v_{bus}) = \sqrt{\frac{v_{bus}}{R_e \langle i_l \rangle_{T_s}}}.$$

Here $v_{bus}$ is the instantaneous bus voltage, $\langle i_l \rangle_{T_s}$ is average inductor current in a switching interval and $R_e$ is emulated input resistance of the converter. Note that the computation of the duty cycle commands involves simple mathematical operations of addition, subtraction, multiplication, division and square root, which can be easily done in a modern microcontroller. The duty cycles are computed in a microcontroller and are allowed to saturate if they hit the limits. These duty cycle commands are then used to compute the four switched signals of the converter. The duty cycle

TABLE I

Four-switch buck-boost converter component parameters.

Figure 12:
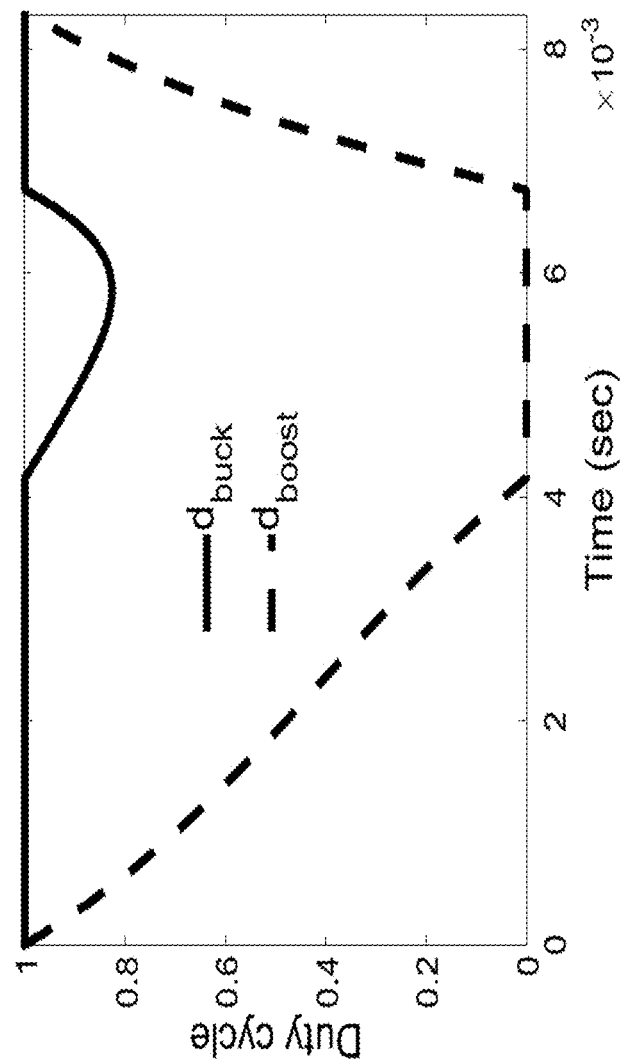
FIG. 12 shows a graph showing example four-switch buck-boost duty cycle commands $d_{buck}$ and $d_{boost}$ plotted over half line cycle.

| Switching Frequency | Inductance (L) | Capacitance (C) | Micro-controller |
|---|---|---|---|
| 100 kHz | 300 µH | 250 µF | TMS320F28069 | commands after passing through saturation are shown in FIG. 12. It can be observed that the converter automatically transitions between buck and boost modes over the line cycle, without any effort on part of the controller to switch modes. Due to this the controller retains simplicity and achieves automatic mode transition at the mode boundary.

Emulated input resistance $R_e$ of the converter determines input power flow of the converter. This, as discussed earlier and shown in FIG. 11, is computed by implementing an outer voltage loop to match input power with load power. Output of the outer voltage loop compensator is then used in inner hybrid feedforward controller. Note that since the output of outer voltage loop compensator is a slowly varying signal, it makes negligible impact on the performance of inner current control loop in steady state.

Implementation of the PFC operation using four-switch buck-boost converter using hybrid feedforward controller offers several advantages. Reduction in number of sensors, sensing continuous signals, ease of controller implementation and automatic mode transition make the four-switch buck-boost converter with the control architecture well-suited for PFC ac-dc conversion.

4. Experimental Results

A prototype of the four-switch buck-boost converter acting as a power factor correction rectifier is designed, built and tested. The converter is designed for 1 kW of input power, operating at a switching frequency of 100 kHz. Inductance and capacitance values used in the converter are listed in Table I.

In order to implement the control architecture described in Section III.A.3, a TI 32-bit microcontroller listed in Table I is used. Average inductor current and output voltage of the converter is sensed and sampled at the converter switching frequency of 100 kHz. The sensed commands are then processed in the microcontroller to compute two duty cycle commands $d_{buck}$ and $d_{boost}$ for the converter in every switching interval as discussed in Section III.A.3. The duty cycle commands are then processed by digital pulse width modulator to generate four switched commands for the converter.

Figure 14:
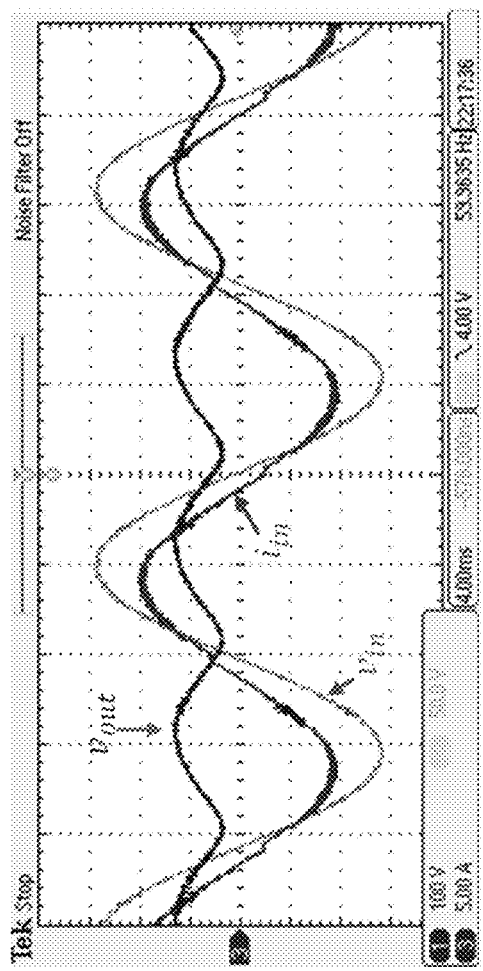
FIG. 14 is a graph showing input voltage, input current and output voltage waveforms of four-switch buck-boost converter acting as PFC stage with Input voltage ($v_{in}$) of 105 $V_{rms}$, input current ($i_{in}$) of 7 $A_{rms}$ and output voltage ($v_{out}$) of 90 V.
Figure 13:
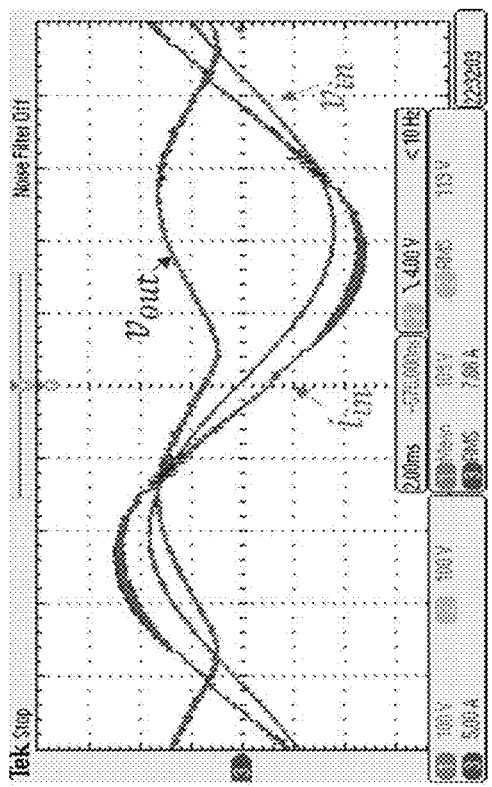
FIG. 13 is a graph showing input voltage, input current and output voltage waveforms of an example four-switch buck-boost converter acting as PFC stage with Input voltage ($v_{in}$) of 120 $V_{rms}$, input current ($i_{in}$) of 7.9 $A_{rms}$ and output voltage ($v_{out}$) of 110 V.
Figure 15:
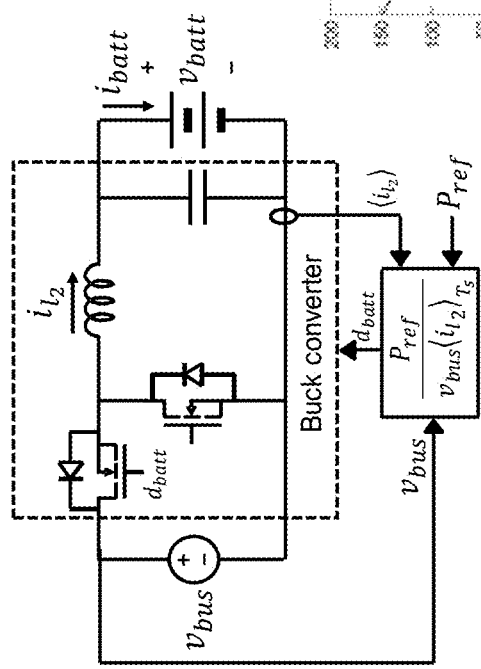
FIG. 15 shows a schematic diagram of an example power regulation of battery implemented using hybrid feedforward controller based buck converter.

FIG. 13 shows the converter waveforms when the converter is operating at a line voltage of 120 $V_{rms}$ and processing 950 W of power. The converter achieves close to unity power factor. Output voltage of the converter is 110 V with twice line frequency ripple, lower than peak input voltage 170 V. Experimental results at line voltage of 105 $V_{rms}$ are shown in FIG. 14. Lag in input current with respect to input voltage in the experimental results is due to capacitive filter employed at the converter input. Apart from phase lag, the converter achieves good performance. It can be observed that the converter transitions between buck and boost modes automatically over the line cycle.

B. Buck Converter Based Power Regulation Stage:

Hybrid feedforward control can also be implemented for the power regulation stage of the battery charger. To realize this stage, a synchronous buck converter operating in CCM is selected, as shown in FIG. 8. The input voltage of the buck converter has twice line frequency ripple because of the finite size of the energy buffering capacitor at the output of the previous stage. Furthermore, battery voltage is also subject to change depending on the state of charge of the battery. An ideal power regulator should maintain constant charging power in the presence of these disturbances. Here, the input voltage of the buck converter $v_{bus}$ (output voltage of the PFC stage) and its inductor current $i_{l_2}$ are chosen as the independent variables. The desired control objective in this case is $P_{batt} = v_{batt} i_{batt} = P_{ref}$, where $P_{ref}$ is the desired battery charging power, $v_{batt}$ is the battery voltage and $i_{batt}$ is the battery current. To achieve this control objective, following the guidelines presented in Section II, output can be represented in terms of the converter independent variables as:

$$u_{out} = P_{batt} = v_{batt} i_{batt} = g(v_{bus}, \langle i_{l_2} \rangle_{T_s}, d_{batt}) = d_{batt} v_{bus} \langle i_{l_2} \rangle_{T_s}. \quad (16)$$

Here, $d_{batt}$ is the duty cycle of the power regulation buck converter. Expression (16) can be equated with the reference command:

$$d_{batt} v_{bus} \langle i_{l_2} \rangle_{T_s} = u_{ref} = P_{ref}, \quad (17)$$

which yields the controller duty cycle modulation equation (10) in the following form:

$$d_{batt} = f(\langle i_{l_2} \rangle_{T_s}, v_{bus}, P_{ref}) = \frac{P_{ref}}{v_{bus} \langle i_{l_2} \rangle_{T_s}}. \quad (18)$$

Figure 16:
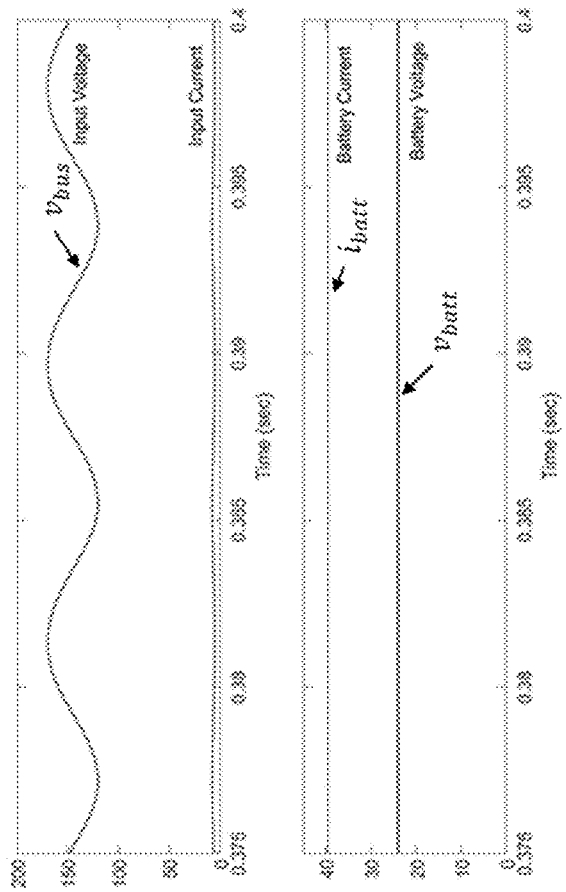
FIG. 16 is a graph showing simulation waveforms of an example power regulation stage. Ripple present in the bus voltage is rejected and battery current is constant.

If the duty cycle of the converter is modulated as given by (18), then the desired power regulation capability can be achieved by the converter. Simulation results verifying power regulation stage operation with hybrid feedforward controller implemented are shown in FIG. 16. It can be observed that twice line frequency ripple present in $v_{bus}$ is rejected and battery current is almost constant.

It can be observed from (13), (15) and (18) that operations of addition, subtraction, multiplication, division and square root may appear in duty cycle modulation equations. These operations can be implemented either digitally or using analog circuits. For digital implementations, modern microcontrollers possess the capability to process all of these operations. For analog implementations, various circuit design techniques can be employed, for example as discussed in Maksimovic et al., Lai et al. and Erickson et al. incorporated herein.

IV. Example Alternate Architectures

A. Four Switch Buck Boost Converter

Figure 17:
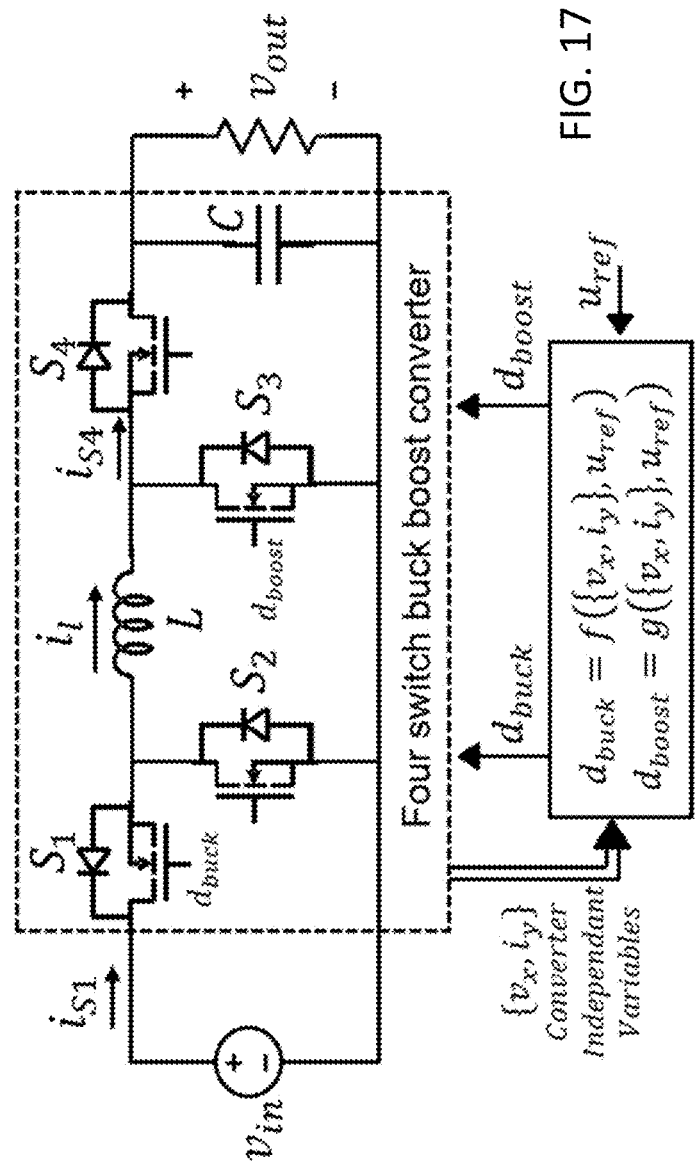
FIG. 17 shows a schematic diagram of a general structure of hybrid feedforward control architecture implemented on four-switch buck-boost converter. The controller senses the converter independent variables and processes them, along with the reference command $u_{ref}$ to generate converter duty cycle.
Figure 18:
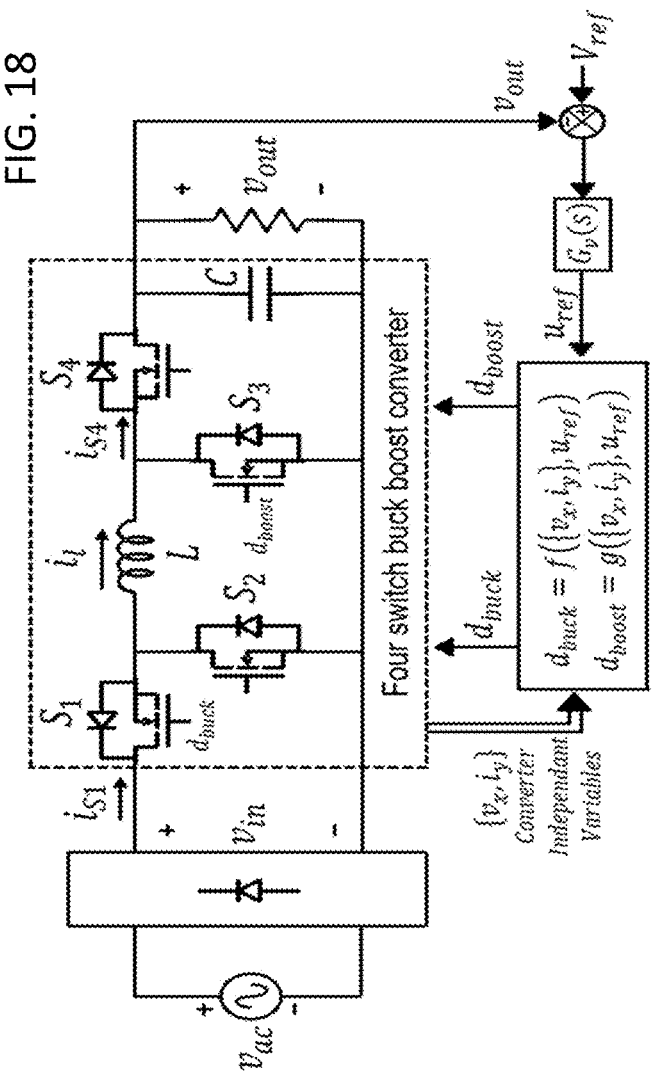
FIG. 18 shows a schematic diagram of a general structure of hybrid feedforward control architecture implemented on four-switch buck-boost converter for ac-dc conversion. The structure comprises an inner hybrid feedforward loop and an outer voltage loop.

Hybrid feedforward control architecture can be realized on four-switch buck-boost converter in multiple ways. FIG. 17 shows a general structure of a hybrid feedforward controller implemented on four-switch buck-boost converter. The controller senses the converter independent variables and utilizes them to compute the converter duty cycles. Choice of converter independent duty cycles can be made in multiple ways as discussed in section II. When the converter is used for dc-ac conversion, the control architecture is shown in FIG. 18. The architecture comprises an inner hybrid feedforward control loop and an outer voltage loop. The inner loop controls the input current flowing into the converter and the outer voltage loop controls the output voltage of the converter by controlling power flow into the converter, as discussed earlier.

To implement ac-dc conversion hybrid feedforward controller on four-switch based buck-boost converter, different choices of converter independent variables are possible. Table II lists example(?) choices of converter independent variables and corresponding duty cycle equations. Choice of converter independent variable can be made based on convenience of employing sensors to sense converter voltages/currents. One convenient choice of converter independent variables is sensing output voltage and inductor current. Apart from its use in inner hybrid feedforward control loop, sensing of output voltage of the converter can be implemented for the outer voltage loop. Thus, in this example, it is used twice, in the inner hybrid feedforward control loop and in the outer voltage loop. Furthermore, since the converter is operating in CCM, as discussed earlier, second converter independent variable should be the converter current. Choice of inductor current is convenient as the current is continuous, ideally free from converter switching noise and thus the average can be easily computed. The control architecture with this choice of converter independent variables has been discussed earlier and shown in FIG. 11. Other choices of converter independent variables can be made as a matter of convenience of employing sensors.

TABLE II

Possible choices of converter independent variables and corresponding duty cycle signals for controlling four switch buck boost converter as power factor correction rectifier.

| Converter independent variables $\{v_x, i_y\}$ | Boost duty cycle $d_{boost} = f\left(\{v_x, i_y\}, \frac{1}{R_e}\right)$ | Buck duty cycle $d_{buck} = f\left(\{v_x, i_y\}, \frac{1}{R_e}\right)$ | Mode of Operation |
|---|---|---|---|
| $v_{out}, \langle i_l \rangle_{T_s}$ | $1 - \dfrac{R_e \langle i_l \rangle_{T_s}}{v_{out}}$ | $\sqrt{\dfrac{v_{out}}{R_e \langle i_l \rangle_{T_s}}}$ | CCM |
| $v_{out}, \langle i_{in} \rangle_{T_s}$ | $1 - \dfrac{R_e \langle i_{in} \rangle_{T_s}}{v_{out}}$ | $\dfrac{v_{out}}{R_e \langle i_{in} \rangle_{T_s}}$ | CCM |
| $v_{out}, \langle i_{out} \rangle_{T_s}$ | $1 - \sqrt{\dfrac{R_e \langle i_{out} \rangle_{T_s}}{v_{out}}}$ | $\sqrt{\dfrac{v_{out}}{R_e \langle i_{out} \rangle_{T_s}}}$ | CCM |
| $v_{in}, \langle i_{out} \rangle_{T_s}$ | $1 - \dfrac{R_e \langle i_{out} \rangle_{T_s}}{v_{in}}$ | $\dfrac{v_{in}}{R_e \langle i_{out} \rangle_{T_s}}$ | CCM |

B. Buck Converter

Figure 19:
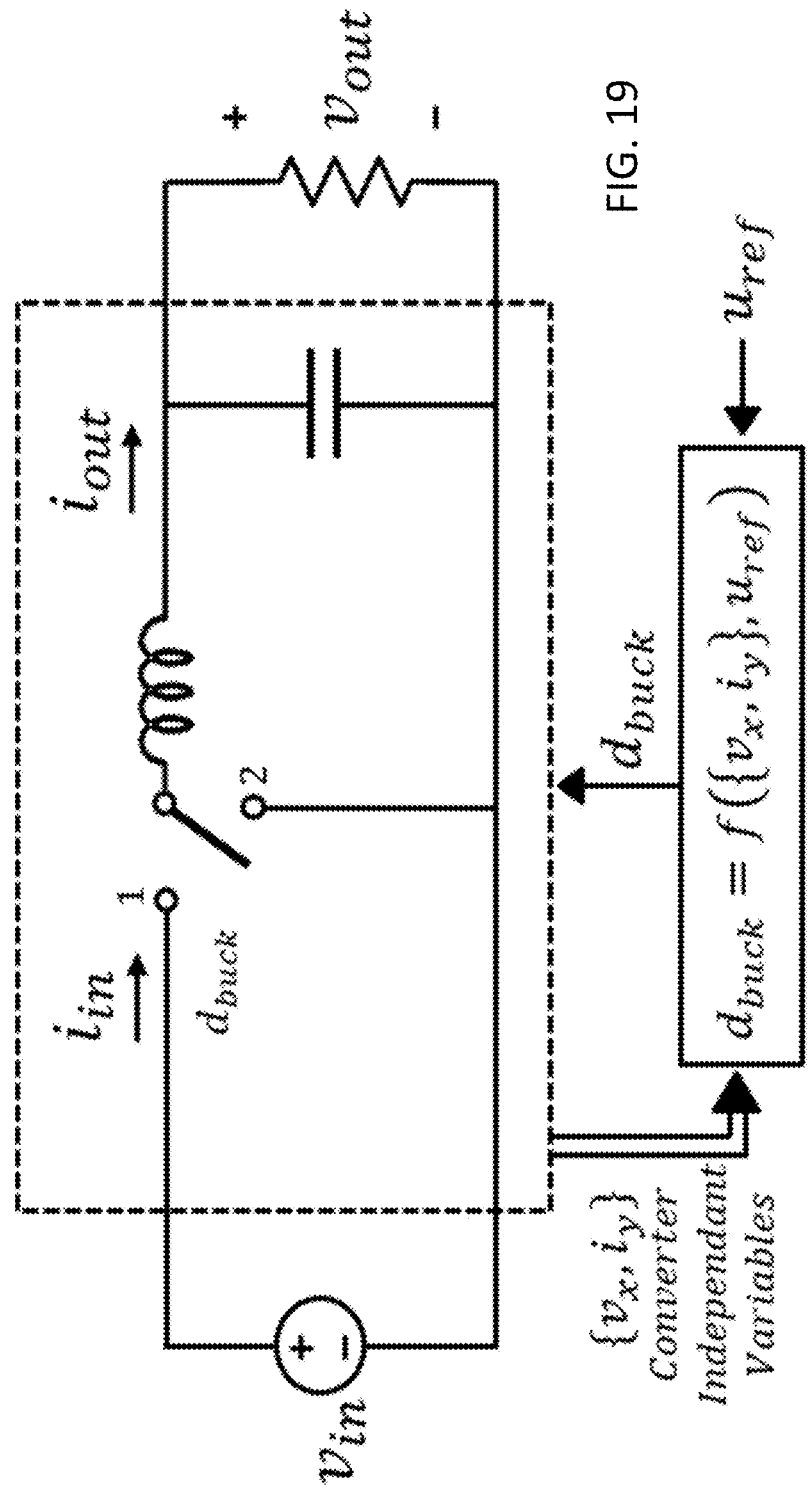
FIG. 19 shows a schematic diagram of a general structure of hybrid feedforward control architecture implemented on buck converter. The controller senses the converter independent variables and processes them, along with the reference command $u_{ref}$ to generate converter duty cycle commands.
Figure 19A:
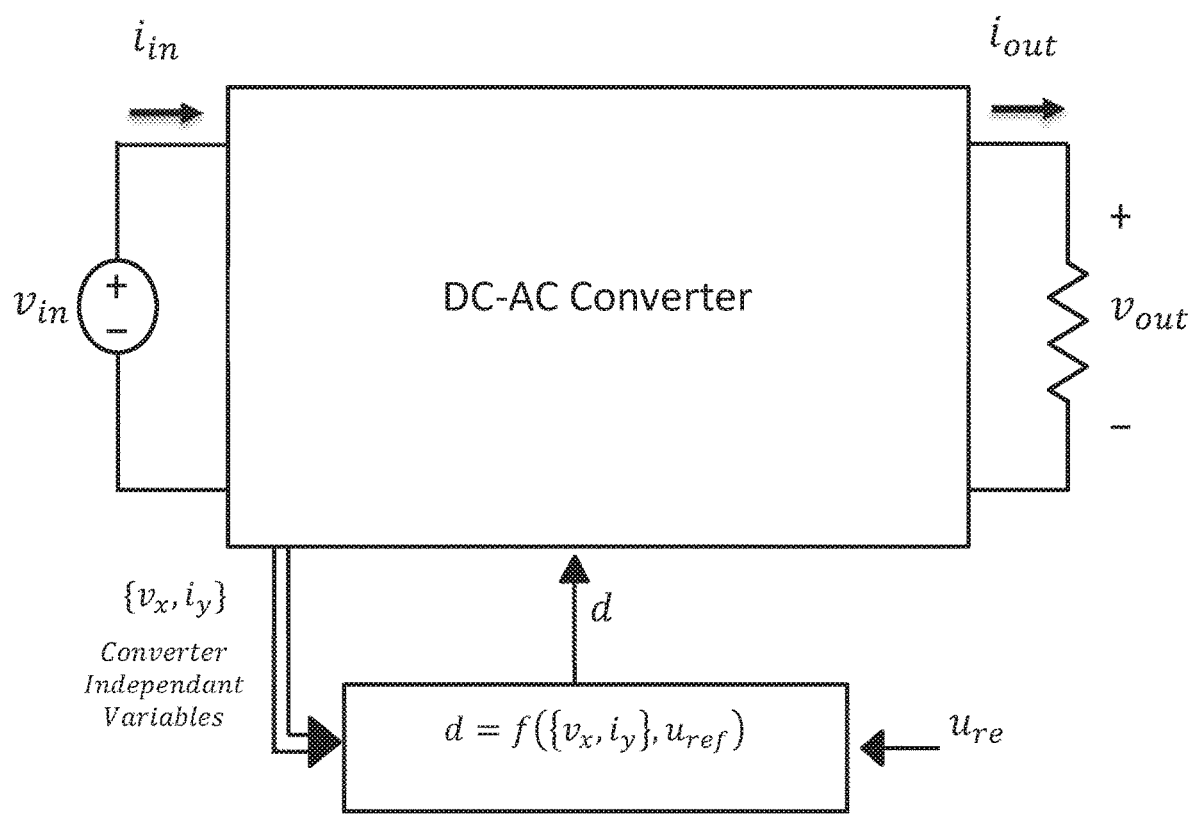
FIG. 19A shows a schematic diagram of another implementation of a hybrid feedforward control architecture implemented on a dc-ac converter. The controller senses the converter independent variables and processes them, along with the reference command $u_{ref}$ to generate converter duty cycle commands.

Hybrid feedforward controller implemented on buck converter is shown in FIG. 19. The controller senses the converter independent variables, processes them according to duty cycle modulation equation and generates duty cycle $d_{buck}$ for the converter. The duty cycle modulation equation depends upon the nature of processing the converter is commanded to do and is an outcome of the synthesis process discussed in Section II. The converter can be designed to achieve dc-dc conversion, dc-ac conversion (see, e.g., FIG. 19A), ac-dc converter, current regulation or power regulation. Section III.B discusses one such example of power regulation achieved using buck converter in a battery charger system. Other power processing functions can be achieved by selecting appropriate converter independent variables and designing the controller to process specific duty cycle modulation equation following the procedure discussed in Section II.

C. Boost Converter

Figure 20:
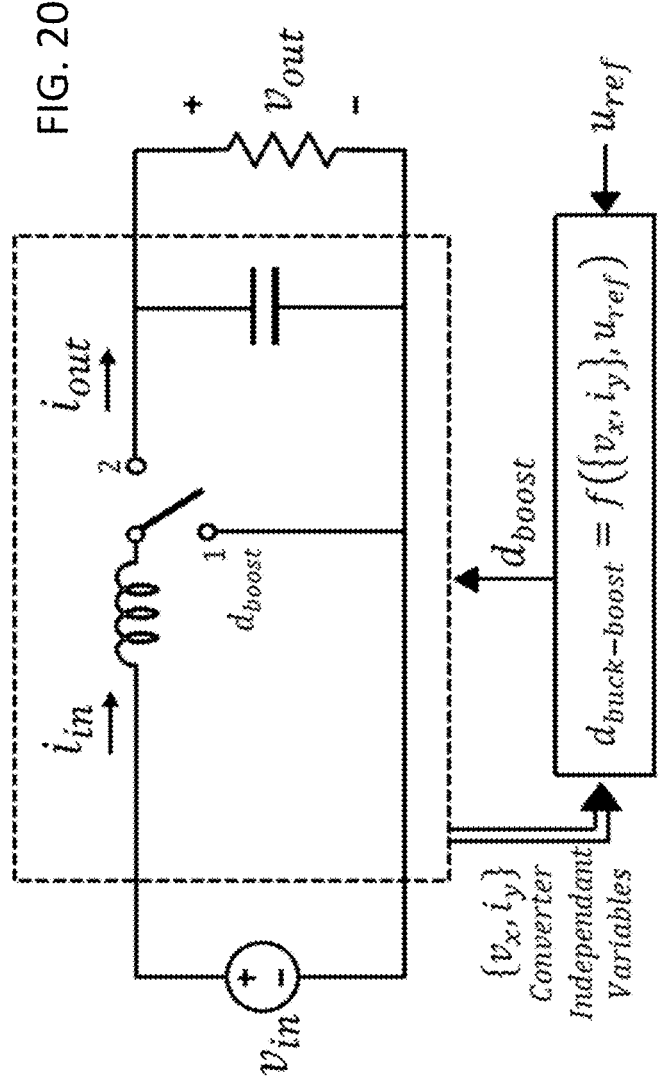
FIG. 20 shows a schematic diagram of a general structure of hybrid feedforward control architecture implemented on boost converter. The controller senses the converter independent variables and processes them, along with the reference command $u_{ref}$ to generate converter duty cycle commands.
Figure 21:
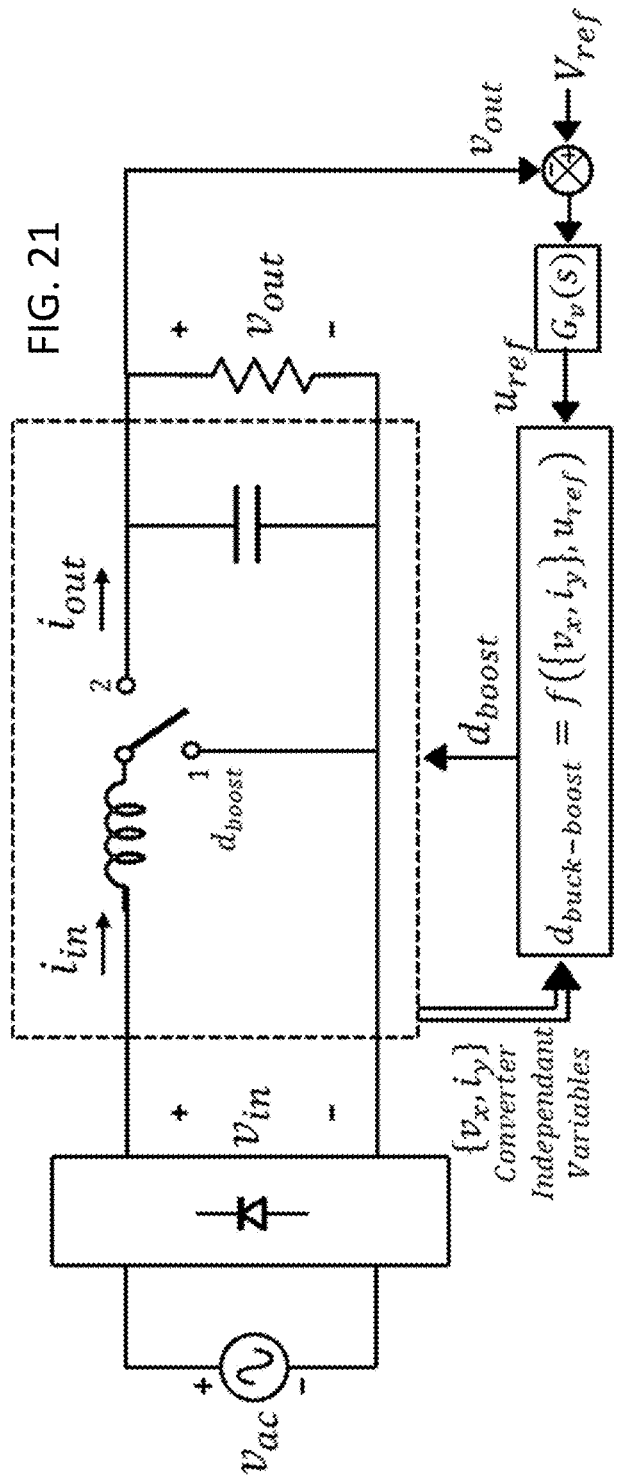
FIG. 21 shows a schematic diagram of a general structure of hybrid feedforward control architecture implemented on boost converter for ac-dc conversion. The structure comprises an inner hybrid feedforward loop and an outer voltage loop.

Hybrid feedforward controller implemented on boost converter is shown in FIG. 20. The controller senses the converter selected independent variables, processes them using duty cycle modulation function and generates duty cycle command $d_{boost}$ for the converter. The converter with the control architecture can be used for ac-dc conversion as shown in FIG. 21. Few well known ac-dc conversion controllers implemented using hybrid feedforward controller include non-linear carrier control of boost converter [7], [8] and open loop control of boost converter in DCM [9], [10]. Other possible choices of converter independent variables and corresponding duty cycle modulation functions are given in Table III.

The proposed controller presented in Table III can be compared with well-known open loop control of boost converter and non-linear carrier control. In the open loop control, the converter operates in DCM over complete line cycle. This creates significant EMI noise. Furthermore, input current of the converter has significant switching content, putting high stress on the EMI filter. Additionally, peak currents can be much larger in DCM operation as compared to CCM operation, requiring significant derating of semiconductor devices. On the other hand, the proposed controllers are designed for the converter to operate in CCM over the line cycle, easing EMI filter design and generating less EMI noise. In comparison with non-linear carrier control, the sensed signals here include input current sensing which is continuous in nature and free from switching noise, while non-linear carrier control relies on sensing switch current. The switch current contains significant switching noise, making it difficult to average switch current and need additional circuitry which can complicate design, while average inductor current can be sensed directly without employing complex circuitry.

TABLE III

Possible choices of converter independent variables and corresponding duty cycle signals for controlling boost converter as power factor correction rectifier.

| | Boost duty cycle | |
|---|---|---|
| Converter independent variables $\{v_x, i_y\}$ | $d_{boost} = f\left(\{v_x, i_y\}, \dfrac{1}{R_e}\right)$ | Mode of Operation |
| $v_{out}, \langle i_{in} \rangle_{T_s}$ | $1 - \dfrac{R_e \langle i_{in} \rangle_{T_s}}{v_{out}}$ | CCM |

TABLE III-continued

Possible choices of converter independent variables and corresponding duty cycle signals for controlling boost converter as power factor correction rectifier.

| | Boost duty cycle | |
|---|---|---|
| Converter independent variables $\{v_x, i_y\}$ | $d_{boost} = f\left(\{v_x, i_y\}, \dfrac{1}{R_e}\right)$ | Mode of Operation |
| $v_{out}, \langle i_{out} \rangle_{T_s}$ | $1 - \sqrt{\dfrac{R_e \langle i_{out} \rangle_{T_s}}{v_{out}}}$ | CCM |

D. Cuk Converter

Figure 22:
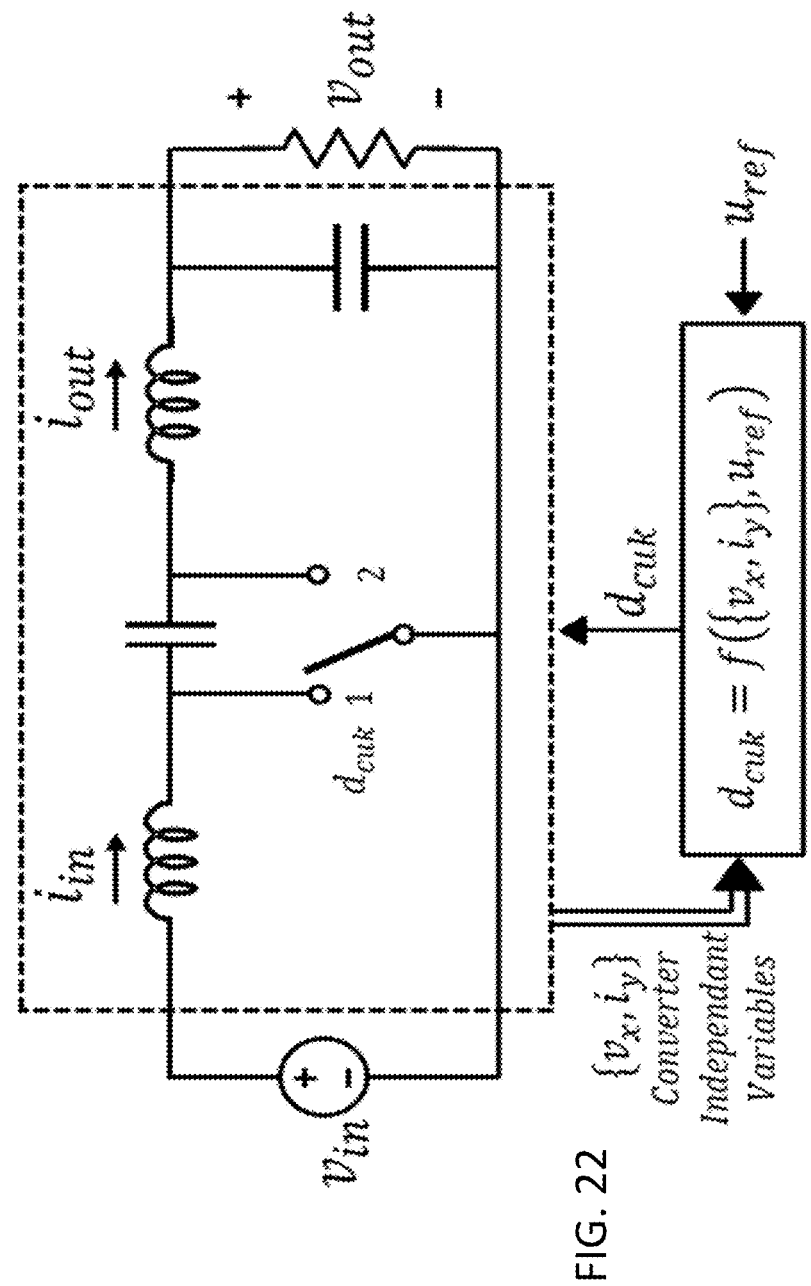
FIG. 22 shows a schematic diagram of a general structure of hybrid feedforward control architecture implemented on Cuk converter. The controller senses the converter independent variables and processes them, along with the reference command $u_{ref}$, to generate converter duty cycle commands.
Figure 23:
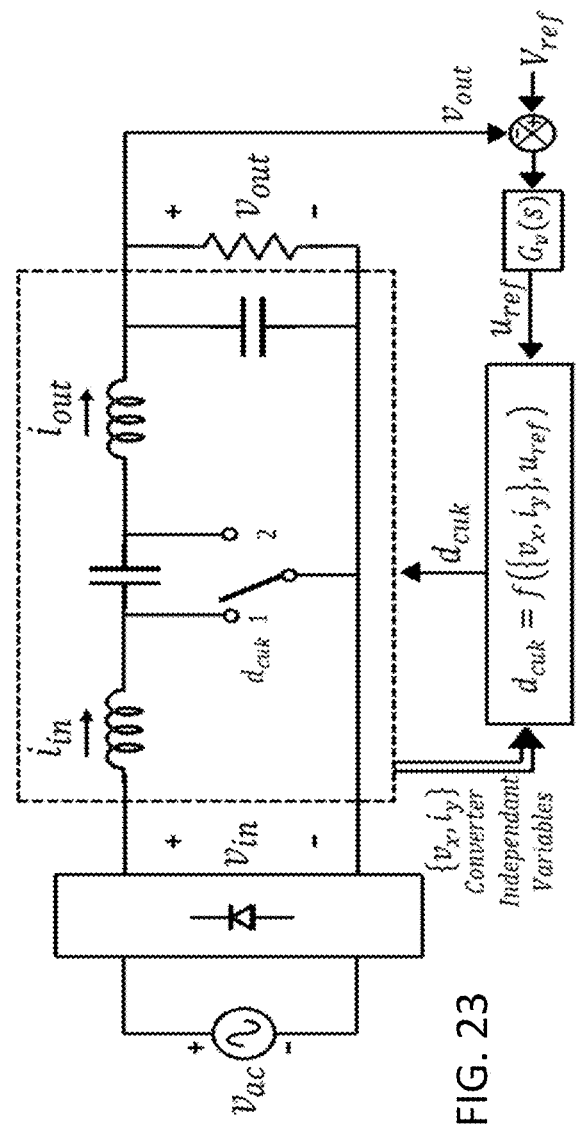
FIG. 23 shows a schematic diagram of a general structure of hybrid feedforward control architecture implemented on Cuk converter for ac-dc conversion. The structure comprises an inner hybrid feedforward loop and an outer voltage loop.

Cuk converter with hybrid feedforward control implemented is shown in FIG. 22. As discussed earlier, the converter independent variables are sensed and processed to compute duty cycle $d_{cuk}$ for the converter. The converter can be used for ac-dc conversion in an architecture shown in FIG. 23. Different choices of converter independent variables leading to different choices of duty cycle modulation equations are listed in Table. IV. Some of the earlier work that has considered hybrid feedforward controller for ac-dc conversion on Cuk converter is non-linear carrier control and constant duty cycle control.

The controller for Cuk converter presented in Table IV can be compared with constant duty cycle control and non-linear carrier control. The proposed controllers are designed for the converter to operate in CCM over the line cycle. In CCM the converter generates significantly less EMI, as compared to DCM operation. Furthermore, filter employed at the input of the converter to filter switching current can be much smaller for CCM operation than for DCM operation. Additionally, peak current are significantly larger in DCM operation than in CCM operation, requiring derated semiconductor devices. Constant duty cycle control of Cuk converter relies on the operation of the converter in DCM, making it susceptible to the issues mentioned.

In comparison with non-linear carrier control, non-linear carrier controller senses average switch current which contains significant switching harmonics, making it difficult to sense and can create cross talk with other sensed signal. On the other hand, the prsposed controller senses input and output currents which are continuous in nature and free from switching noise.

TABLE IV

Possible choices of converter independent variables and corresponding duty cycle signals for controlling Cuk converter as power factor correction rectifier.

| | Cuk duty cycle | |
|---|---|---|
| Converter independent variables $\{v_x, i_y\}$ | $d_{cuk} = f\left(\{v_x, i_y\}, \dfrac{1}{R_e}\right)$ | Mode of Operation |
| $v_{out}, \langle i_{in} \rangle_{T_s}$ | $\dfrac{1}{1 - \dfrac{R_e \langle i_{in} \rangle_{T_s}}{v_{out}}}$ | CCM |
| $v_{out}, \langle i_{out} \rangle_{T_s}$ | $\dfrac{1}{1 + \sqrt{\dfrac{R_e \langle i_{out} \rangle_{T_s}}{v_{out}}}}$ | CCM |

E. SEPIC Converter

Figure 24:
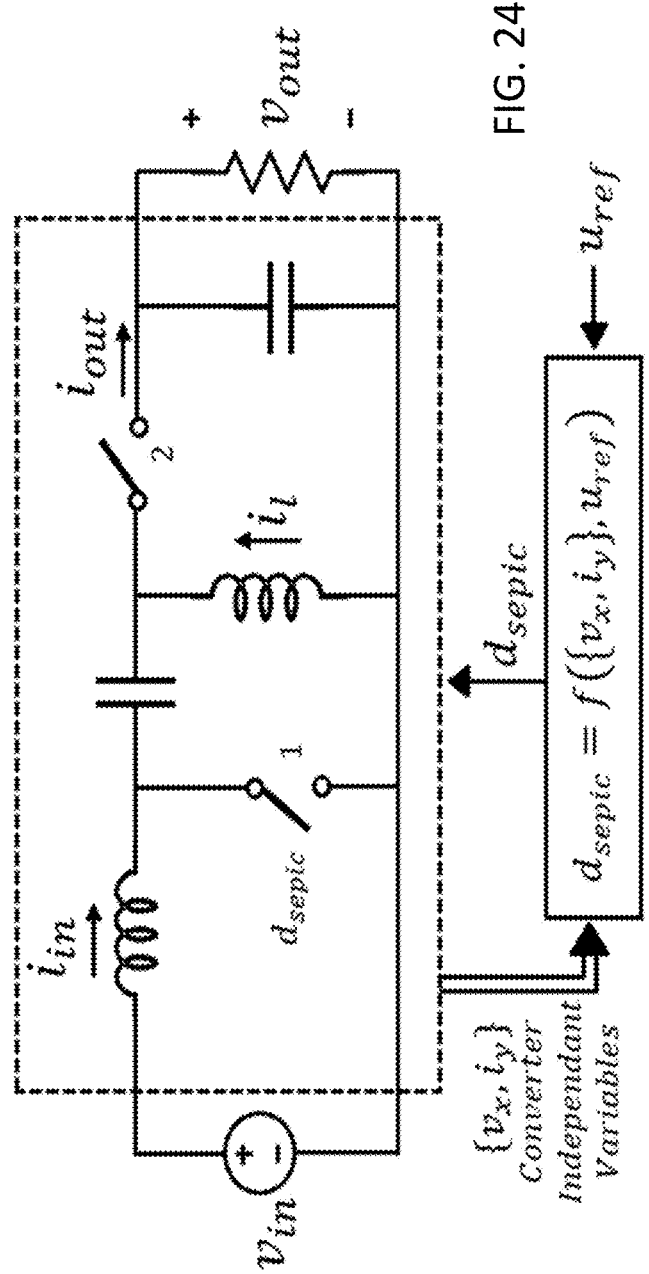
FIG. 24 shows a schematic diagram of a general structure of hybrid feedforward control architecture implemented on SEPIC converter. The controller senses the converter independent variables and processes them, along with the reference command $u_{ref}$, to generate converter duty cycle commands.
Figure 25:
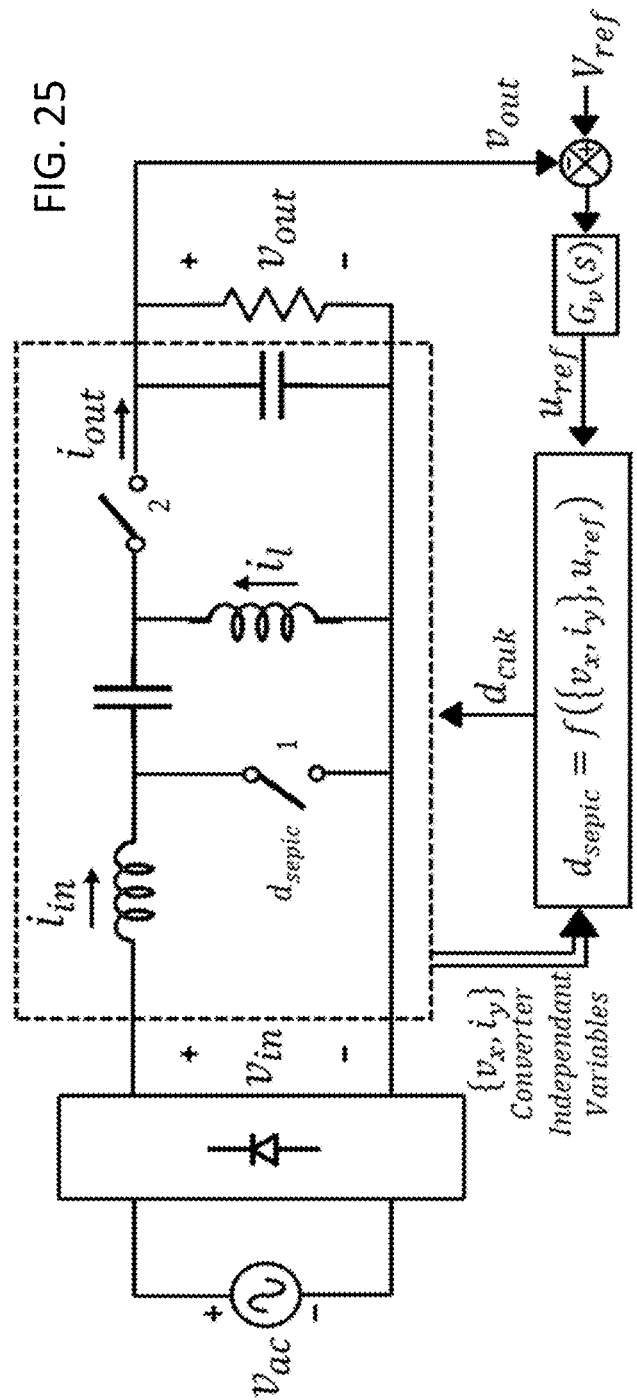
FIG. 25 shows a schematic diagram of a general structure of hybrid feedforward control architecture implemented on SEPIC converter for ac-dc conversion. The structure comprises an inner hybrid feedforward loop and an outer voltage loop.

A general structure of an example SEPIC converter with a hybrid feedforward controller implemented is shown in FIG. 24. In this example, the controller senses the converter independent variables and processes them to produce duty cycle command $d_{sepic}$ for the converter. The converter with control architecture can be used for ac-dc conversion as shown in FIG. 25. Some of the possible choices of converter independent variables and duty cycle modulation functions are listed in Table V. Other example hybrid feedforward control architectures for SEPIC converter based ac-dc converter implementations include non-linear carrier control and constant duty cycle control.

Some of the benefits that the particular choice of converter independent variables presented in Table V, $(v_{out}, \langle i_{in} \rangle_{T_s})$ and $(v_{out}, \langle i_{in} \rangle_{T_s})$, over non-linear carrier control include sensing of continuous inductor currents, as compared to sensing switching signal which has high frequency content and can additionally create cross-talk with other sensed signals. Furthermore, in comparison with constant duty cycle control which relies on the converter operation in DCM, the proposed controller relies on the converter operating in CCM over the line cycle. CCM operation generates less EMI noise, reduces peak semiconductor currents and eases EMI filter implementation.

TABLE V

Possible choices of converter independent variables and corresponding duty cycle signals for controlling SEPIC converter as power factor correction rectifier.

| Converter independent variables $\{v_x, i_y\}$ | SEPIC converter duty cycle $d_{sepic} = f\left(\{v_x, i_y\}, \frac{1}{R_e}\right)$ | Mode of Operation |
|---|---|---|
| $v_{out}, \langle i_{in} \rangle_{T_s}$ | $\dfrac{1}{1 + \dfrac{R_e \langle i_{in} \rangle_{T_s}}{v_{out}}}$ | CCM |
| $v_{out}, \langle i_{out} \rangle_{T_s}$ | $\dfrac{1}{1 + \sqrt{\dfrac{R_e \langle i_{out} \rangle_{T_s}}{v_{out}}}}$ | CCM |
| $v_{out}, \langle i_l \rangle_{T_s}$ | $\dfrac{1}{1 + \sqrt{\dfrac{R_e \langle i_l \rangle_{T_s}}{v_{out}}}}$ | CCM |

F. Buck Boost Converter

Figure 26:
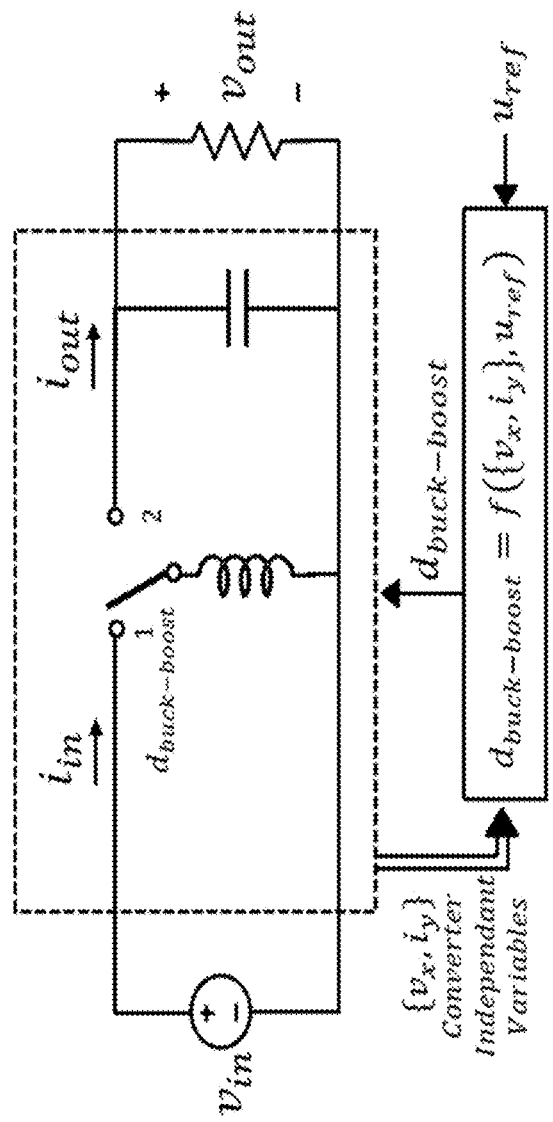
FIG. 26 shows a schematic diagram of a general structure of hybrid feedforward control architecture implemented on buck-boost converter. The controller senses the converter independent variables and processes them, along with the reference command $u_{ref}$, to generate converter duty cycle commands.
Figure 27:
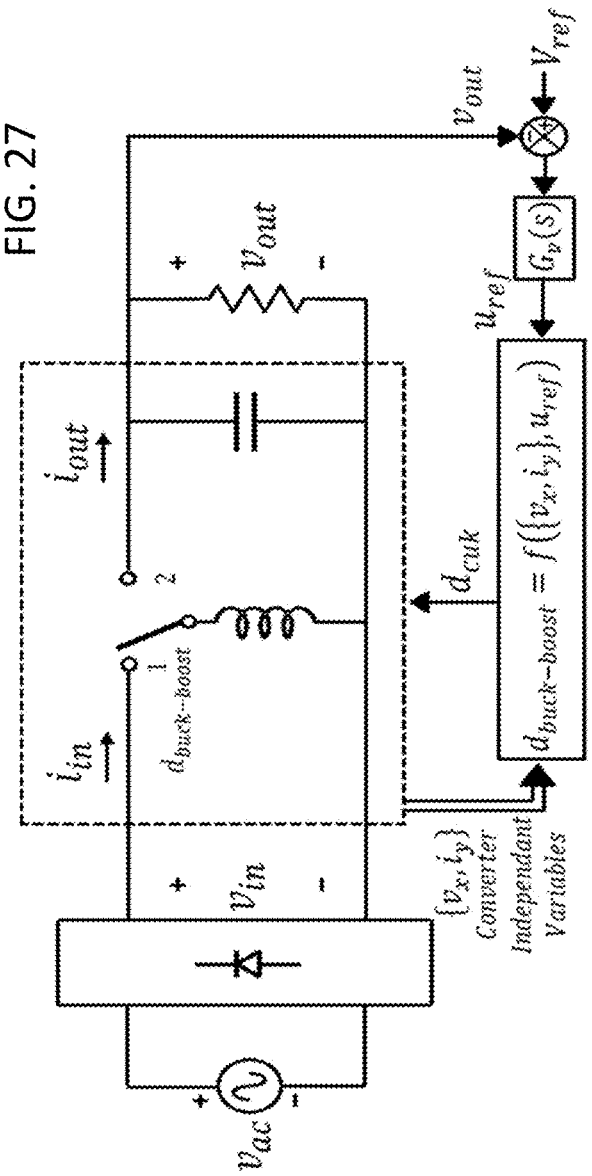
FIG. 27 shows a schematic diagram of a general structure of hybrid feedforward control architecture implemented on buck-boost converter for ac-dc conversion. The structure comprises an inner hybrid feedforward loop and an outer voltage loop.

An example buck boost converter topology with a hybrid feedforward controller implemented is shown in FIG. 26 The controller senses the converter independent variables and processes them to generate duty cycle command $d_{buck\text{-}boost}$ for the converter. When the converter is used for ac-dc conversion, the control architecture with inner hybrid feedforward controller and outer voltage loop controller is shown in FIG. 27. Some possible choices of converter independent variables, corresponding duty cycle modulation equations and the converter mode of operation are listed in table VI.

It can be noted that one of the choice of converter independent variable $(v_{out}, \langle i_l \rangle_{T_s})$ yields duty cycle modulation equation in the form of a second order equation. The equation has two solutions. The solution with physical meaning is the duty cycle for the converter. Example hybrid feedforward controllers for buck boost converter based ac-dc converter also include constant duty cycle control and non-linear carrier control. Sensing of inductor current, listed in last row of Table VI is very convenient as compared to switch current sensing in non-linear carrier control, as the inductor current is a continuous signal and sensor signal is not corrupted with switching noise of the circuit. In comparison with constant duty cycle control, which relies on DCM operation of the circuit, the proposed controller relies on CCM operation of the converter. CCM operation significantly lowers EMI noise, eases input filter implementation and reduces peak current rating of semiconductor devices.

TABLE VI

Possible choices of converter independent variables and corresponding duty cycle signals for controlling buck-boost converter as power factor correction rectifier.

| Converter independent variables $\{v_x, i_y\}$ | Buck Boost duty cycle $d_{buck\text{-}boost} = f\left(\{v_x, i_y\}, \frac{1}{R_e}\right)$ | Mode of Operation |
|---|---|---|
| $v_{out}, \langle i_{out} \rangle_{T_s}$ | $\dfrac{1}{1 + \sqrt{\dfrac{R_e \langle i_{out} \rangle_{T_s}}{v_{out}}}}$ | CCM |
| $v_{out}, \langle i_l \rangle_{T_s}$ | $d^2 R_e = -\dfrac{d' v_{out}}{i_l}$ | CCM |

G. Flyback Converter

Figure 28:
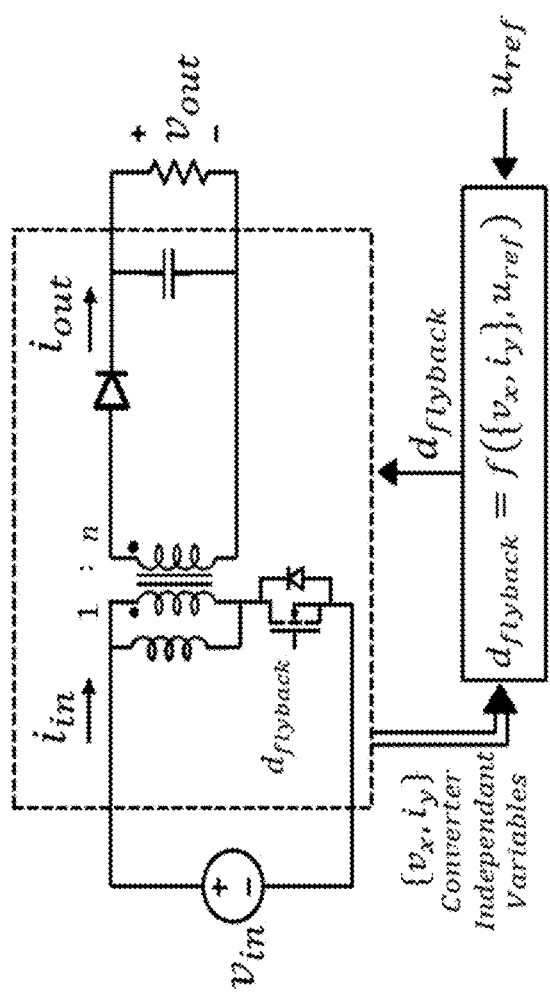
FIG. 28 shows a schematic diagram of a general structure of hybrid feedforward control architecture implemented on flyback converter for ac-dc conversion. The structure comprises an inner hybrid feedforward loop and an outer voltage loop.
Figure 29:
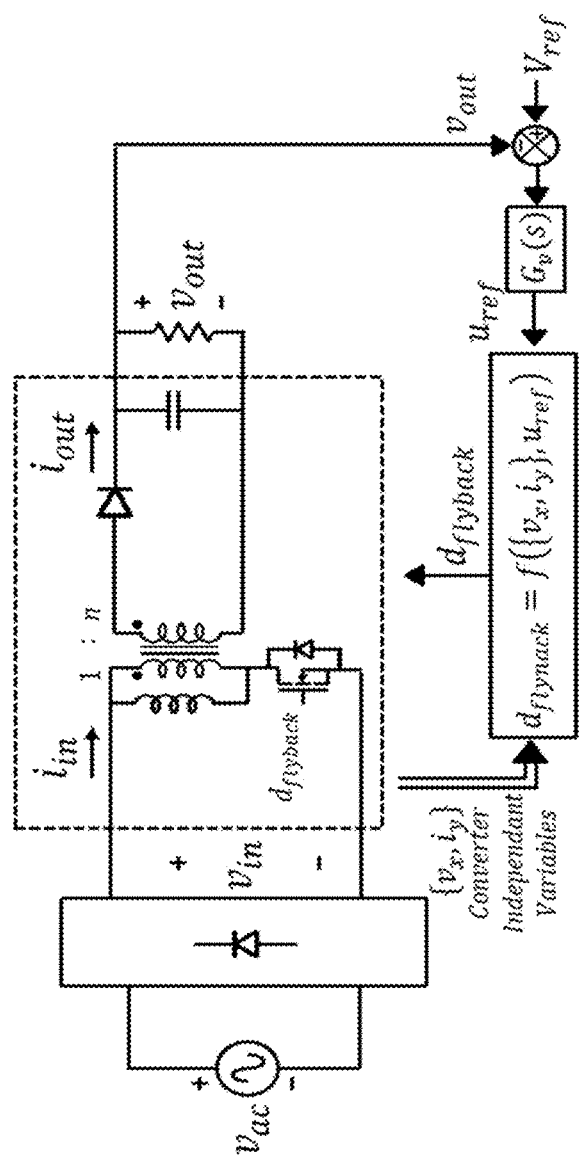
FIG. 29 shows a schematic diagram of a general structure of hybrid feedforward control architecture implemented on flyback converter. The controller senses the converter independent variables and processes them, along with the reference command $u_{ref}$, to generate converter duty cycle commands.

A flyback converter utilizing the hybrid feedforward controller architecture is shown in FIG. 28. The controller senses the converter independent variables, computes the duty cycle using a duty cycle modulation equation, and outputs the duty cycle for the converter. FIG. 29 shows an example implementation of a flyback converter utilizing the hybrid feedforward controller architecture, in which the converter performs ac to dc conversion. In this implementation, the inner hybrid feedforward control loop acts as the current regulation loop, and the outer feedback loop regulates the output voltage $v_{out}$ of the converter. Some example hybrid feedforward controllers implemented on flyback converter based ac-dc converter include constant duty cycle control and non-linear carrier control. In the non-linear carrier control, output voltage and average input current are sensed and processed to generate the duty cycle for the converter. Another possible implementation with a different choice of converter independent variables and duty cycle command modulation equation is given in Table VII. Here output voltage and average output current of the converter are sensed and processed to generate duty cycle for the converter.

A benefit this provides as compared to non-linear carrier control is that both variables are sensed on the output side of the converter, thus isolation of the transformer is not disturbed by employing sensors. To feedback the duty cycle command, a digital command, digital isolators can be used. On the other hand, in non-linear carrier control, average input current and output voltage are sensed and thus isolation of the transformer can be effect because of currents flowing through the sensing path.

In comparison with constant duty cycle control, which relies on DCM operation of the circuit, this example controller relies on CCM operation of the converter. CCM operation significantly lowers EMI noise, eases input filter implementation and reduces peak current rating of semiconductor devices.

TABLE VII

Possible choices of converter independent variables and corresponding duty cycle signals for controlling flyback converter as power factor correction rectifier.

| Converter independent variables $\{v_x, i_y\}$ | Flyback duty cycle $d_{flyback} = f\left(\{v_x, i_y\}, \dfrac{1}{R_e}\right)$ | Mode of Operation |
|---|---|---|
| $v_{out}, \langle i_{out}\rangle_{T_s}$ | $\dfrac{1}{1 + n\sqrt{\dfrac{R_e \langle i_{out}\rangle_{T_s}}{v_{out}}}}$ | CCM |

Although implementations have been described above with a certain degree of particularity, those skilled in the art could make numerous alterations to the disclosed embodiments without departing from the spirit or scope of this invention. All directional references (e.g., upper, lower, upward, downward, left, right, leftward, rightward, top, bottom, above, below, vertical, horizontal, clockwise, and counterclockwise) are only used for identification purposes to aid the reader's understanding of the present invention, and do not create limitations, particularly as to the position, orientation, or use of the invention. Joinder references (e.g., attached, coupled, connected, and the like) are to be construed broadly and may include intermediate members between a connection of elements and relative movement between elements. As such, joinder references do not necessarily infer that two elements are directly connected and in fixed relation to each other. It is intended that all matter contained in the above description or shown in the accompanying drawings shall be interpreted as illustrative only and not limiting. Changes in detail or structure may be made without departing from the spirit of the invention as defined in the appended claims.

What is claimed is:

1. A dc-dc converter comprising:
a converter stage comprising an input port and an output port and at least one switch disposed between the input port and the output port; and
a controller coupled to the converter stage and adapted to use sensed converter independent variables to determine at least one duty cycle command for the at least one switch of the converter stage by processing the sensed converter independent variables, wherein at least one of the sensed converter independent variables is a variable that has been processed by the converter and the duty cycle relationship is derived based on converter open loop steady state characteristics,
wherein the controller is adapted to determine the at least one duty cycle command based at least in part on the converter independent variables and at least one reference command and the controller is adapted to receive the reference command from a compensator of a feedback loop adapted to regulate a converter output by sensing the output, compare the output to a reference output and pass an error signal between the converter output and the reference output to the compensator.

2. The converter of claim 1 wherein the converter stage comprises at least one of the group comprising: four-switch buck-boost, buck, boost, buck-boost, Cuk, SEPIC, and flyback.

3. An ac-dc converter comprising:
an ac-dc converter stage comprising an input port and an output port and at least one switch disposed between the input port and the output port; and
a controller coupled to the ac-dc converter stage that utilizes hybrid feedforward control to determine at least one duty cycle command for the at least one switch of the ac-dc converter stage, wherein the hybrid feedforward control of the controller is implemented using at least one converter independent variable and at least one duty ratio modulation of at least one of Tables II, III, IV, V, VI, and VII.

4. The converter of claim 3 wherein the controller receives at least one converter independent variable and is adapted to determine the at least one duty cycle command based at least in part on the at least one converter independent variable.

5. The converter of claim 3 wherein the converter stage comprises at least one of the group comprising: four-switch buck-boost, buck, boost, buck-boost, Cuk, SEPIC, and flyback.

6. The converter of claim 3 wherein the hybrid feedforward control of the controller is implemented using the following converter independent variables $v_{out}, \langle i_1\rangle_{T_s}$ and duty ratio modulation of at least one of the following:

$$1 - \dfrac{R_e \langle i_l\rangle_{T_s}}{v_{out}} \text{ and } \sqrt{\dfrac{v_{out}}{R_e \langle i_l\rangle_{T_s}}}.$$

7. The converter of claim 3 wherein the hybrid feedforward control of the controller is implemented using the following converter independent variables $v_{out}, \langle i_{in}\rangle_{T_s}$ and duty ratio modulation of at least one of the following:

$$1 - \dfrac{R_e \langle i_{in}\rangle_{T_s}}{v_{out}} \text{ and } \dfrac{v_{out}}{R_e \langle i_{in}\rangle_{T_s}}.$$

8. The converter of claim 3 wherein the hybrid feedforward control of the controller is implemented using the following converter independent variables $v_{out}, \langle i_{out}\rangle_{T_s}$ and duty ratio modulation of at least one of the following:

$$1 - \sqrt{\dfrac{R_e \langle i_{out}\rangle_{T_s}}{v_{out}}} \text{ and } \sqrt{\dfrac{v_{out}}{R_e \langle i_{out}\rangle_{T_s}}}.$$

9. The converter of claim 8 wherein the controller is adapted to determine the at least one duty cycle command by utilizing converter independent variables and a reference command.

10. The converter of claim 8 wherein the controller is adapted to determine the at least one duty cycle command based upon converter independent variables and a reference command using at least one of digital circuit or at least one analog circuit.

11. The converter of claim 3 wherein the hybrid feedforward control of the controller is implemented using the following converter independent variables $v_{in}, \langle i_{out}\rangle_{T_s}$ and duty ratio modulation of at least one of the following:

$$1 - \frac{R_e \langle i_{out} \rangle_{T_s}}{v_{in}} \text{ and } \frac{v_{in}}{R_e \langle i_{out} \rangle_{T_s}}.$$

12. The converter of claim 3 wherein the ac-dc converter stage comprises a four switch buck-boost converter stage and the hybrid feedforward control of the controller is implemented using at least one converter independent variable and at least one duty ratio modulation of Table II.

13. The converter of claim 3 wherein the ac-dc converter stage comprises a boost converter stage and the hybrid feedforward control of the controller is implemented using at least one converter independent variable and at least one duty ratio modulation of Table III.

14. The converter of claim 3 wherein the ac-dc converter stage comprises a Cuk converter stage and the hybrid feedforward control of the controller is implemented using at least one converter independent variable and at least one duty ratio modulation of Table IV.

15. The converter of claim 3 wherein the ac-dc converter stage comprises a SEPIC converter stage and the hybrid feedforward control of the controller is implemented using at least one converter independent variable and at least one duty ratio modulation of Table V.

16. The converter of claim 3 wherein the ac-dc converter stage comprises a buck-boost converter stage and the hybrid feedforward control of the controller is implemented using at least one converter independent variable and at least one duty ratio modulation of Table VI.

17. The converter of claim 3 wherein the ac-dc converter stage comprises a flyback converter stage and the hybrid feedforward control of the controller is implemented using at least one converter independent variable and at least one duty ratio modulation of Table VII.

18. An ac-dc converter comprising:
a buck ac-dc converter stage comprising an input port and an output port and at least one switch disposed between the input port and the output port; and
a controller coupled to the ac-dc converter stage that utilizes hybrid feedforward control to determine at least one duty cycle command for the at least one switch of the ac-dc converter stage,
wherein the controller is adapted to determine the at least one duty cycle command based at least in part on the converter independent variables and at least one reference command and the controller is adapted to receive the reference command from a compensator of a feedback loop adapted to regulate a converter output by sensing the output, compare the output to a reference output and pass an error signal between the converter output and the reference output to the compensator.

19. The ac-dc converter of claim 18 wherein the controller receives at least one converter independent variable and is adapted to determine the at least one duty cycle command based at least in part on the at least one converter independent variable.

20. The ac-dc converter of claim 18 wherein the controller is adapted to determine the at least one duty cycle command by utilizing at least one converter independent variable and a reference command.

21. A dc-ac converter comprising:
a dc-ac converter stage comprising an input port and an output port and at least one switch disposed between the input port and the output port; and
a controller coupled to the converter stage and adapted to use sensed converter independent variables to determine at least one duty cycle command for the at least one switch of the converter stage by processing the sensed converter independent variables, wherein at least one of the sensed converter independent variables is a variable that has been processed by the converter and the duty cycle relationship is derived based on converter open loop steady state characteristics,
wherein the controller is adapted to determine the at least one duty cycle command based at least in part on the converter independent variables and at least one reference command and the controller is adapted to receive the reference command from a compensator of a feedback loop adapted to regulate a converter output by sensing the output, comparing the output to a reference output and passing an error signal between the converter output and the reference output to the compensator.

22. The dc-ac converter of claim 21 wherein the controller is adapted to use sensed converter independent variables to determine the at least one duty cycle command and at least one of the sensed converter independent variables is a variable that has been processed by the converter.

23. The dc-ac converter of claim 21 wherein the converter stage comprises at least one of the group comprising: four-switch buck-boost, buck, boost, buck-boost, Cuk, SEPIC, and flyback.

* * * * *